US008798412B2

(12) United States Patent
Bookbinder et al.

(10) Patent No.: US 8,798,412 B2
(45) Date of Patent: Aug. 5, 2014

(54) OPTICAL FIBER CONTAINING AN ALKALI METAL OXIDE AND METHODS AND APPARATUS FOR MANUFACTURING SAME

(75) Inventors: Dana C. Bookbinder, Corning, NY (US); Lisa C. Chacon, Corning, NY (US); Adam J. G. Ellison, Painted Post, NY (US); Rostislav R. Khrapko, Corning, NY (US); Stephan L. Logunov, Corning, NY (US); Michael T. Murtagh, Painted Post, NY (US); Sabyasachi Sen, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 913 days.

(21) Appl. No.: 10/929,142

(22) Filed: Aug. 27, 2004

(65) Prior Publication Data

US 2005/0063663 A1  Mar. 24, 2005

Related U.S. Application Data

(60) Provisional application No. 60/498,901, filed on Aug. 29, 2003, provisional application No. 60/528,639, filed on Dec. 10, 2003.

(51) Int. Cl.
   *G02B 6/02* (2006.01)
(52) U.S. Cl.
   USPC ............ 385/31; 385/126; 385/141; 385/142; 385/144
(58) Field of Classification Search
   USPC ............ 385/140–142, 123–128, 147; 501/42; 65/398
   See application file for complete search history.

(56) References Cited

U.S. PATENT DOCUMENTS

| 3,971,645 A | 7/1976 | Bachmann et al. ................ 65/3 |
| 4,419,115 A | 12/1983 | Johnson, Jr. et al. .......... 65/3.12 |

(Continued)

FOREIGN PATENT DOCUMENTS

| EP | 0 321 182 | 12/1988 | ............ C03B 37/025 |
| EP | 0 673 895 | 3/1995 | ............. C03C 25/00 |

(Continued)

OTHER PUBLICATIONS

Lines, M.E., "*Can the minimum attenuation of fused silica be significantly reduced by small compositional variations? I. Alkali metal dopants*", Journal of Non-Crystalline Solids 171 (1994), pp. 209-218.

(Continued)

*Primary Examiner* — Tina Wong
(74) *Attorney, Agent, or Firm* — Robert L Carlson

(57) ABSTRACT

Disclosed is an optical fiber having a core with an alkali metal oxide dopant in an peak amount greater than about 0.002 wt. % and less than about 0.1 wt. %. The alkali metal oxide concentration varies with a radius of the optical fiber. By appropriately selecting the concentration of alkali metal oxide dopant in the core and the cladding, a low loss optical fiber may be obtained. Also disclosed are several methods of making the optical fiber including the steps of forming an alkali metal oxide-doped rod, and adding additional glass to form a draw perform. Preferably, the draw preform has a final outer dimension (d2), wherein an outer dimension (d1) of the rod is less than or equal to 0.06 times the final outer dimension (d2). In a preferred embodiment, the alkali metal oxide-doped rod is inserted into the centerline hole of a preform to form an assembly.

38 Claims, 18 Drawing Sheets

(56) References Cited

U.S. PATENT DOCUMENTS

| | | | |
|---|---|---|---|
| 4,504,297 A | 3/1985 | Kosinski et al. | 65/3.11 |
| 4,515,612 A | 5/1985 | Burrus, Jr. et al. | 65/3.12 |
| 4,579,571 A | 4/1986 | Hicks, Jr. | 65/3.12 |
| 5,106,402 A | 4/1992 | Geittner et al. | 65/3.12 |
| 5,146,534 A * | 9/1992 | Lines | 385/142 |
| 5,152,817 A | 10/1992 | Bennett et al. | 65/3.1 |
| 5,240,488 A | 8/1993 | Chandross et al. | 65/3.11 |
| 5,306,322 A | 4/1994 | Ishikawa et al. | 65/3.12 |
| 6,116,055 A | 9/2000 | Ishikawa et al. | 65/399 |
| 6,153,546 A | 11/2000 | Saitoh et al. | 501/37 |
| 6,343,175 B1 | 1/2002 | Sasaoka | 385/123 |
| 7,536,076 B2 * | 5/2009 | Khrapko et al. | 385/142 |
| 2002/0031320 A1 | 3/2002 | Nagayama et al. | 385/127 |
| 2003/0087743 A1 * | 5/2003 | Dejneka et al. | 501/42 |
| 2004/0057692 A1 * | 3/2004 | Ball et al. | 385/142 |
| 2004/0206127 A1 | 10/2004 | Coffey et al. | 65/390 |
| 2005/0089289 A1 | 4/2005 | Hayami et al. | 385/127 |
| 2008/0050086 A1 * | 2/2008 | Bickham et al. | 385/142 |
| 2008/0271495 A1 * | 11/2008 | Balakrishnan et al. | 65/421 |

FOREIGN PATENT DOCUMENTS

| | | | |
|---|---|---|---|
| EP | 0 793 122 | 9/1997 | G02B 6/13 |
| GB | 2 126 820 | 3/1984 | G01S 17/02 |
| GB | 2 149 392 | 6/1985 | C03C 23/00 |
| JP | 62-80606 | 4/1987 | G02B 6/10 |
| JP | 62-283845 | 12/1987 | C03C 13/04 |
| JP | 63-40744 | 2/1988 | C03C 13/04 |
| JP | 63-195147 | 8/1988 | C03C 13/04 |

OTHER PUBLICATIONS

Lines, M.E., "*Can the minimum attenuation of fused silica be significantly reduced by small compositional variations? II. Combined fluorine and alkali metal dopants*", Journal of Non-Crystalline Solids 171 (1994), pp. 219-227.

Tian, et al., "*Effect of water incorporation on the diffusion of sodium in an alkaline-earth boroaluminosilicate glass*", Journal of Non-Crystalline Solids 296 (2001), pp. 123-134.

Saito, et al., "*A new method of developing ultralow-loss glasses*", Journal of Applied Physics, vol. 81, No. 11, Jun. 1, 1997, pp. 7129-7134.

Nagayama, et al., "*Ultra Low Loss (0.151 dB/km) Fiber and its Impact on Submarine Transmission Systems*", OFC 2002 Postdeadline Papers, FA10-1-FA10-3.

* cited by examiner

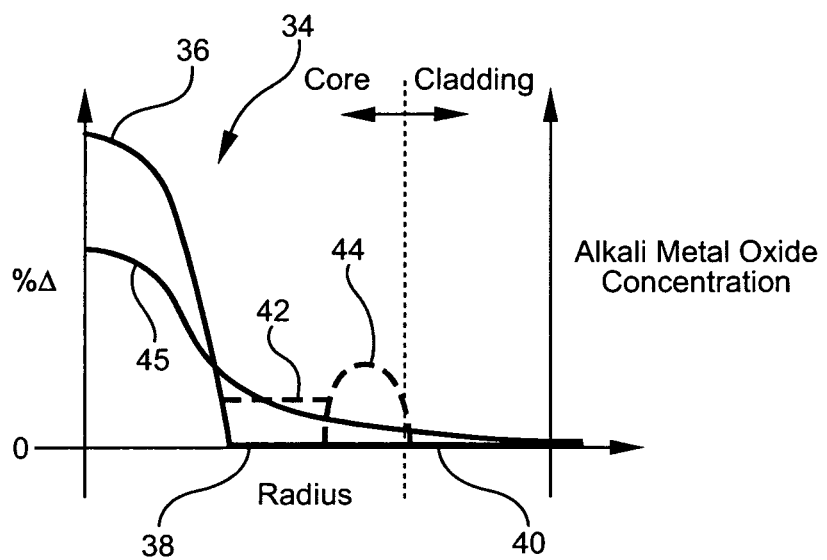
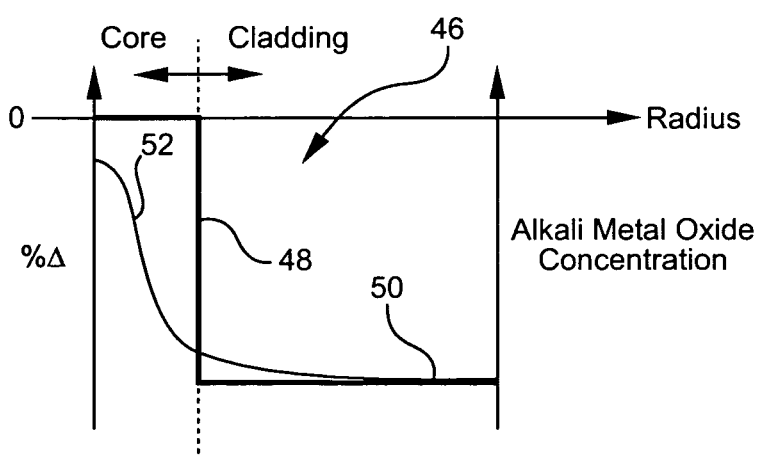

"Enlarged View"

US 8,798,412 B2

OPTICAL FIBER CONTAINING AN ALKALI METAL OXIDE AND METHODS AND APPARATUS FOR MANUFACTURING SAME

CROSS-REFERENCE TO RELATED APPLICATIONS

This application claims the benefit of priority under 35 U.S.C. §119(e) of U.S. Provisional Application Ser. Nos. 60/498,901 filed on Aug. 29, 2003 and No. 60/528,639 filed on Dec. 10, 2003, said applications being hereby incorporated by reference herein.

BACKGROUND OF THE INVENTION

1. Field of the Invention

The present invention relates generally to an optical fiber doped with an alkali metal oxide and methods and apparatus for making same.

2. Technical Background

Attenuation is a principal limiting attribute of optical fibers. Optical fiber loss, for example, plays an important role in setting the limiting distance between optical fiber amplifiers. This is particularly important in long distance and ultra-long distance networks such as, for example, undersea applications, where such amplifiers represent a significant system cost, as well as a major factor in system reliability. Consequently there is tremendous commercial interest in reducing attenuation to the lowest possible level.

SUMMARY OF THE INVENTION

One broad aspect of the present invention relates to an optical fiber having a core comprising an alkali metal oxide selected from the group consisting of $K_2O$, $Na_2O$, $LiO2$, $Rb_2O$, $Cs_2O$ and mixtures thereof, in a peak concentration greater than about 0.001 wt. % and less than about 1 wt. %; a cladding comprising the alkali metal oxide in a peak concentration less than the peak concentration in the core but greater than about 0.0005 wt. %; and wherein the concentration of alkali metal oxide varies with a radius of the optical fiber. The alkali metal oxide dopant concentration preferably decreases with increasing radius from the centerline of the optical fiber. Using the alkali metal oxide doping techniques disclosed herein, optical fibers can be made which exhibit an attenuation less than about 0.30 dB/km at 1310 nm and less than about 0.18 dB/km at 1550 nm; preferably less than about 0.17 dB/km at 1550 nm, more preferably less than about 0.16 dB/km at 1550 nm.

Preferably, both the core and the cladding of the optical fiber contain an alkali metal oxide dopant. The cladding glass of the optical fiber may comprise fluorine (F). The optical fiber has at least one core segment; in some preferred embodiments, the optical fiber comprises multiple core segments. The alkali metal oxide concentration at a radius equal to the mode field radius of the optical fiber is preferably at least about 0.001 wt. %.

The present invention proposes an optical fiber having a core comprising an alkali metal oxide selected from the group consisting of $K_2O$, $Na_2O$, $LiO2$, $Rb_2O$, $Cs_2O$ and mixtures thereof, wherein the core contains less than 20 ppb of OH.

According to another aspect of embodiments of the invention, an optical fiber is proposed having a core comprising an alkali metal oxide selected from the group consisting of $Rb_2O$, $Cs_2O$ and mixtures thereof, in a peak concentration greater than about 0.001 wt. % and less than about 1 wt. %, a cladding comprising the alkali metal oxide in a peak concentration less than the peak concentration in the core, but greater than about 0.0005 wt. %, and wherein the concentration of alkali metal oxide varies with a radius of the optical fiber.

According to still another aspect of embodiments of the invention, an optical fiber is proposed comprising a core containing $Rb_2O$ in a peak concentration greater than about 0.001 wt. % and less than about 1 wt. %, a cladding comprising $Rb_2O$ in a peak concentration less than the peak concentration in the core, but greater than about 0.0005 wt. % and wherein the concentration of alkali metal oxide varies with a radius of the optical fiber.

According to another broad aspect of the present invention, an optical fiber may be provided comprising a core comprising $GeO_2$ and an alkali metal oxide selected from the group consisting of $K_2O$, $Na_2O$, $LiO2$, $Rb_2O$, $Cs_2O$ and mixtures thereof, and wherein a refractive index of the optical fiber is selected to provide a total dispersion greater than about 1 ps/nm/km at about 1550 nm, and a dispersion slope less than about 0.10 $ps/nm^2/km$ at 1550 nm. Preferably, the optical fiber has a total dispersion greater than about 6 ps/nm/km at 1550 nm. Preferably, the optical fiber has an attenuation less than about 0.18 dB/km at 1550 nm; more preferably less than about 0.17 dB/km at 1550 nm. Preferably, the optical fiber is drawn at a draw speed of at least 10 m/s.

According to another aspect of the invention, an optical fiber is disclosed herein comprising: a silica-based core comprising a first dopant selected from the group consisting of germania and fluorine and mixtures thereof, and an alkali metal oxide selected from the group consisting of $K_2O$, $Na_2O$, $LiO_2$, $Rb_2O$, $Cs_2O$ and mixtures thereof, in a peak concentration between 20 and 1000 ppm; and a silica-based cladding surrounding and directly adjacent the core; wherein the attenuation at 1550 nm is less than 0.185 dB/km, preferably less than 0.18 dB/km, more preferably less than 0.17 dB/km. In some preferred embodiments, the attenuation at 1550 nm is less than or equal to 0.167 dB/km. In preferred embodiments, the concentration of alkali metal oxide in the core decreases with a radius of the optical fiber. Preferably, the peak concentration of alkali metal oxide in the core is greater than about 0.002 wt. % and less than about 0.07 wt. %. In preferred embodiments, the alkali metal oxide concentration at a radius equal to a mode field radius of the optical fiber is at least about 0.0001 wt. %. In some embodiments, the core comprises $GeO_2$, and in other embodiments, the core comprises no $GeO_2$. In some embodiments, the core comprises a single segment. In other embodiments, the core comprises a plurality of segments. In some preferred embodiments, the cladding comprises F, particularly in some embodiments where the core has no germania. In preferred embodiments, the peak amount of alkali metal oxide in the core is greater than about 0.002 wt % and less than about 0.05 wt. %. In various embodiments, the optical fiber comprises an exterior hermetic coating; in particular embodiments, the first dopant is germania, i.e. the fiber is germania-doped, and the optical fiber further comprises an exterior hermetic coating. In some preferred embodiments, the optical fiber is a single mode fiber, for example single-moded at 1550 nm; in other preferred embodiments, the optical fiber is a multimode fiber, which preferably has a graded refractive index profile. Some preferred embodiments are non-zero dispersion shifted optical fibers having a dispersion at 1550 nm between 1 and 6 ps/nm-km, and other embodiments have a dispersion at 1550 nm between 6 and 15 ps/nm-km.

According to yet another aspect of the invention, an optical fiber is disclosed herein comprising: a core comprising $GeO_2$ and an alkali metal oxide selected from the group consisting of $K_2O$, $Na_2O$, $LiO2$, $Rb_2O$, $Cs_2O$ and mixtures thereof; and a cladding surrounding the core, wherein a refractive index profile of the optical fiber is selected to provide a total dispersion greater than about 1 ps/nm/km at 1550 nm, and a dispersion slope less than about 0.10 ps/nm$^2$/km at the zero dispersion wavelength. In preferred embodiments, the total dispersion is greater than about 6 ps/nm$^2$/km at 1550 nm. Preferably, the attenuation at 1550 nm less than about 0.18 dB/km, more preferably less than about 0.17 dB/km.

In another broad aspect of the invention, an optical fiber is disclosed herein comprising: a core comprising an alkali metal oxide selected from the group consisting of $Rb_2O$ and $Cs_2O$ and mixtures thereof, in a peak concentration greater than about 0.001 wt. % and less than about 1 wt. %; and a cladding surrounding and directly adjacent the core.

In still another broad aspect of the invention, an optical fiber is disclosed herein comprising: a core comprising $Rb_2O$ in a peak concentration greater than about 0.001 wt. % and less than about 1 wt. %; and a cladding surrounding and directly adjacent the core.

In another broad aspect of the invention, an optical fiber is disclosed herein comprising: a silica-based core comprising a first dopant selected from the group consisting of germania and fluorine and mixtures thereof, and an alkali metal oxide selected from the group consisting of $K_2O$, $Na_2O$, $LiO_2$, $Rb_2O$, $Cs_2O$ and mixtures thereof, in a peak concentration between 20 and 1000 ppm; and a silica-based cladding surrounding and directly adjacent the core; wherein the core has a refractive index profile with a peak relative refractive index, $\Delta_{MAX}$, greater than 0.2%, relative to the cladding. Preferably, the optical fiber has an attenuation at 1550 nm of less than 0.185 dB/km, more preferably less than 0.18 dB/km, even more preferably less than or equal to 0.17 dB/km. In some preferred embodiments, the attenuation at 1550 nm is less than or equal to 0.167 dB/km. In some preferred embodiments, the fiber is a multimode fiber and the core comprises at least 70 wt % $SiO_2$. In other preferred embodiments, the core comprises at least 80 wt % $SiO_2$. In still other preferred embodiments, the core comprises at least 90 wt % $SiO_2$. Preferably, the optical fiber is a single-mode fiber and the core comprises at least 90 wt % $SiO_2$. Preferably, the core further comprises chlorine in a peak concentration of less than 3000 ppm. Preferably, the peak concentration of the alkali metal oxide is less than 700 ppm. Preferably, the average concentration of the alkali metal oxide is less than 350 ppm. In some preferred embodiments, the peak concentration of the alkali metal oxide is less than 500 ppm, that is the peak concentration of the alkali metal oxide is between 20 and 500 ppm. In preferred embodiments, the alkali metal oxide is $K_2O$. In a first set of preferred embodiments, the first dopant is germania and the peak concentration of the alkali metal oxide is between 30 and 300 ppm, preferably between 30 and 150 ppm. The core preferably further comprises chlorine in a peak concentration less than 3000 ppm. Preferably, the core has a maximum concentration of fluorine of less than 0.2 wt %. In some preferred embodiments, the cladding comprises an alkali metal oxide selected from the group consisting of $K_2O$, $Na_2O$, $LiO_2$, $Rb_2O$, $Cs_2O$ and mixtures thereof, in a peak concentration of less than 100 ppm. In a second set of preferred embodiments, the first dopant is fluorine and the peak concentration of the alkali metal oxide is between 200 and 500 ppm, and some preferred embodiments is between 100 and 300 ppm. Preferably, the core has a concentration of fluorine of greater than 0.02 wt %, even more preferably the core has a concentration of fluorine of greater than 0.02 wt % at the centerline. Preferably, the core has a concentration of fluorine of greater than 0.15 wt %. Preferably, the core has a maximum concentration of fluorine of between 0.5 and 1.5 wt %. In particularly preferred embodiments of the second set, the core contains essentially no germania, preferably no germania. Preferably, the cladding has a minimum concentration of fluorine of at least 1.0 wt %. In preferred embodiments, the alkali metal oxide is $K_2O$. In some embodiments, the core further comprises chlorine in a peak concentration less than 500 ppm. Preferably, the cladding comprises an alkali metal oxide selected from the group consisting of $K_2O$, $Na_2O$, $LiO_2$, $Rb_2O$, $Cs_2O$ and mixtures thereof, in a peak concentration of less than 100 ppm.

An optical fiber preform is disclosed herein having a center portion consisting essentially of solid glass, the center portion being surrounded by an outer portion comprised of glass soot, wherein the center portion contains an alkali metal oxide selected from the group consisting of $K_2O$, $Na_2O$, $LiO2$, $Rb_2O$, $Cs_2O$ and mixtures thereof. Preferably, the alkali metal oxide is selected from the group consisting of $K_2O$ and $Rb_2O$. Preferably, the center portion also contains $GeO_2$. The outer portion preferably comprises $GeO_2$. The center portion preferably contains less than 20 ppb OH.

In still another broad aspect of the present invention, a method of making an optical fiber is disclosed comprising forming a first glass rod comprising an alkali metal oxide selected from the group consisting of $K_2O$, $Na_2O$, $LiO_2$, $Rb_2O$, $Cs_2O$ and mixtures thereof, and inserting the first glass rod into a centerline hole of an optical fiber preform to form a composite preform assembly. In one preferred embodiment, the glass rod comprises $GeO_2$. Preferably, the optical fiber preform comprises $GeO_2$. At various points in its manufacture, the optical fiber preform preferably comprises a glass soot.

Yet another broad aspect of the invention involves a method of making an optical fiber comprising providing an optical fiber preform comprising an alkali metal oxide selected from the group consisting of $K_2O$, $Na_2O$, $LiO2$, $Rb_2O$, $Cs_2O$ and mixtures thereof, and drawing the optical fiber preform into an optical fiber, wherein the draw speed and the draw tension are selected to control a concentration of alkali metal oxide in the optical fiber, and wherein the concentration varies with radius.

Another broad aspect of the invention provides for a method of making an optical fiber comprising the steps of providing an optical fiber preform comprising an alkali metal oxide selected from the group consisting of $K_2O$, $Na_2O$, $LiO2$, $Rb_2O$, $Cs_2O$ and mixtures thereof, and heat treating the optical fiber preform for a time and at a temperature effective to obtain a pre-determined concentration of the alkali metal oxide in the optical fiber preform as a function of radius. Preferably, the method includes heat treating the optical fiber preform for at least about 6 hours. The optical fiber preform is heat treated preferably at a temperature of at least 1000° C. Preferably, a cladding glass of the optical fiber preform comprises F.

In accordance with another broad aspect, the invention provides for a method of making an optical fiber comprising the steps providing a glass article having an outer dimension (d1) and doped with an alkali metal oxide selected from the group consisting of $K_2O$, $Na_2O$, $LiO_2$, $Rb_2O$, $Cs_2O$ and mixtures thereof, and adding additional glass to the glass article to form a final consolidated draw preform having a final outer dimension (d2), wherein the outer dimension (d1) is less than or equal to 0.06 times the final outer dimension (d2) thereby concentrating the alkali metal oxide near the center of the final consolidated draw preform.

In accordance with another broad aspect, the invention provides for a method of making an optical fiber comprising the steps of depositing silica-containing soot onto a rotating mandrel to form a silica-containing soot tube, first drying the silica-containing soot tube with a chlorine-containing gas, then further drying the silica-containing soot tube with a fluorine-containing gas, consolidating the silica soot tube to form a glass tube, doping the glass tube or an intermediate article formed from the glass tube with an alkali metal oxide selected from the group consisting of $K_2O$, $Na_2O$, $LiO_2$, $Rb_2O$, $Cs_2O$ and mixtures thereof; collapsing the glass tube or intermediate article to form an alkali-doped rod, and adding additional silica-containing glass onto the alkali-doped rod.

In accordance with a further broad aspect, the invention provides for a method of making an optical fiber comprising the steps of depositing silica-containing soot onto a rotating mandrel to form a silica-containing soot tube, drying the silica-containing soot tube with a chlorine-containing gas, further drying the silica-containing soot tube with a fluorine-containing gas, consolidating the silica soot tube to form a glass tube, doping the glass tube or an intermediate glass article formed from the glass tube with an alkali metal oxide selected from the group consisting of $K_2O$, $Na_2O$, $LiO_2$, $Rb_2O$, $Cs_2O$ and mixtures thereof; collapsing the glass tube or intermediate article to form an alkali-doped rod, inserting the alkali-doped rod into a silica-containing soot tube, forming a core rod from the alkali-doped rod and silica-containing soot tube, adding fluorine-doped silica to the core rod, and consolidating the fluorine-doped silica to form a final draw preform.

Further, and in accordance with another broad aspect, the invention provides for a method of making an optical fiber comprising the steps of depositing germanium-doped silica soot onto a rotating mandrel to form a germanium-doped silica soot tube, drying the germanium-doped silica soot tube with a chlorine-containing gas, further drying the silica-containing soot tube with a fluorine-containing gas, consolidating the germanium-doped silica soot tube to form a glass tube, doping the glass tube or a intermediate article formed from the glass tube with an alkali metal oxide selected from the group consisting of $K_2O$, $Na_2O$, $LiO_2$, $Rb_2O$, $Cs_2O$ and mixtures thereof; forming an alkali-doped rod from the glass tube or the intermediate article, and inserting the alkali-doped rod into a silica-containing soot tube, the silica-containing soot tube including a inner annular portion of germanium-doped silica soot and an outer annular portion of substantially undoped silica soot.

In accordance with another broad aspect, the invention provides for a method of making an optical fiber comprising the steps of depositing silica-containing soot onto a rotating mandrel to form a silica-containing soot tube, drying the silica-containing soot tube with a chlorine-containing gas, further drying the silica-containing soot tube with a fluorine-containing gas, consolidating the silica-containing soot tube to form a glass tube, doping the glass tube or an intermediate article formed from the glass tube with an alkali metal oxide selected from the group consisting of $K_2O$, $Na_2O$, $LiO_2$, $Rb_2O$, $Cs_2O$ and mixtures thereof to form an alkali-doped article wherein the alkali metal oxide is doped in an amount of between about 20-1000 ppm of the alkali metal oxide.

In accordance with another broad aspect, the invention provides a diffusion doping apparatus, comprising a frame, a glass tube mounted for rotation relative to the frame, a source of dopant coupled to the glass tube, and an induction heater mounted proximate to the glass tube.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention. Where appropriate, identical features have been identically numbered.

BRIEF DESCRIPTION OF THE DRAWINGS

FIG. 3 is illustration of another optical fiber refractive index profile having multiple core segments and which is compared to the radially varying concentration of alkali metal oxide in the fiber.

FIG. 4 is an illustration of a portion of a step index optical fiber refractive index profile having a cladding region with an index of refraction less than the refractive index of pure silica, and which is compared to the radially varying concentration of alkali metal oxide in the fiber.

DETAILED DESCRIPTION OF THE INVENTION

Figure 1:
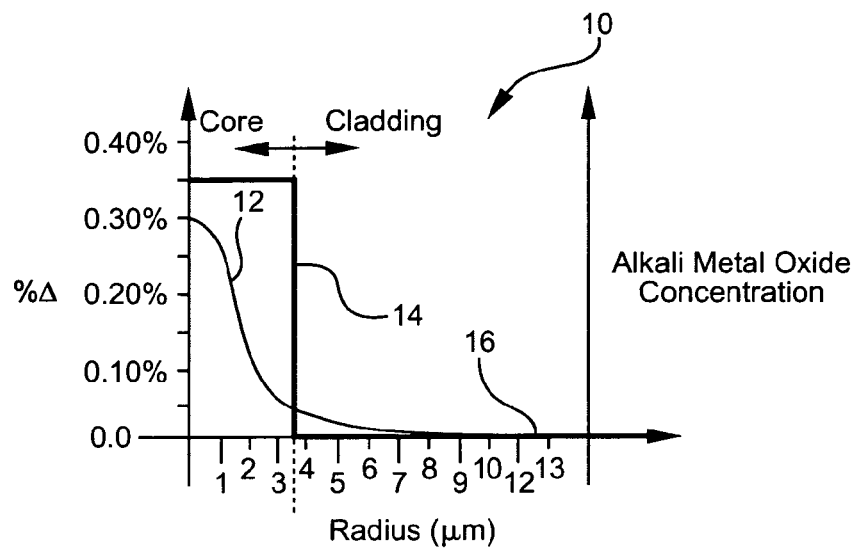
FIG. 1 is an illustration of a portion of a step index optical fiber refractive index profile having an alkali metal oxide concentration that varies with the radius of the optical fiber.

The present invention relates to a low loss optical fiber and methods for making the same. More specifically, the invention relates to an optical fiber doped with an alkali metal oxide dopant and methods for manufacturing the optical fiber and associated preforms. The following terms as used herein have the following meanings:

The mode field diameter is a measure of optical power across the endface of a single-mode optical fiber, and is expressed as:

$$2\omega_0 = (\lambda/\pi)[2\int I(\Phi)\sin\Phi\cos\Phi d\Phi / \int I(\Phi)\sin^3\Phi\cos\Phi d\Phi]^{1/2} \quad (1)$$

where $2\omega_0$ is the mode field diameter (and therefore $\omega_0$ is the mode field radius), $\lambda$ is the mean wavelength of the light, $\Phi$ is the angle with respect to the center of the radiation pattern, and the integrations are preferably carried out from 0° to 90°. Mode field diameter may be measured, for example, according to test procedure ANSI/TIA/EIA-455-191-A-2001.

Effective area is $$A_{eff} = 2\pi(\int E^2 r \, dr)^2 / (\int E^4 r \, dr) \quad (2)$$

where the integration limits are 0 to ∞, and E is the electric field associated with the propagated light.

The relative refractive index, $\Delta$, is defined by the equation $\Delta_i = (n_i^2 - n_c^2)/2n_i^2$, where $n_i$ is the maximum refractive index of the index profile segment i, and $n_c$ is the refractive index in the reference region which is usually taken to be the minimum index of the cladding layer. The relative refractive index is generally expressed as a percent and is indicated herein by the term % $\Delta$. Unless otherwise indicated, % $\Delta$ represents the maximum relative refractive index of the core relative to the minimum refractive index of the cladding.

The term refractive index profile or simply index profile is the relation between % $\Delta$ and radius over a selected portion of the optical fiber, typically the core.

The term alpha profile refers to a core refractive index profile which follows the equation, $$n(r) = n_0(1 - [r/a]^\alpha) \quad (3)$$

where r is core radius, a is the last point in the profile, r is chosen to be zero at the first point of the profile, $n_0$ is the maximum refractive index of the core region of interest, and $\alpha$ is an exponent which defines the core profile shape. Other common core refractive index profile shapes include a step index, a trapezoidal index and a rounded step index, in which the rounding is due to dopant diffusion in regions of rapid refractive index change.

Core refers to that portion of the optical fiber which has a generally raised index of refraction relative to the cladding, so that the transmitted optical power propagates predominately through the core. The core may be comprised of one or more segments. An individual core segment may have a refractive index greater than pure silica, equal to pure silica, or less than pure silica.

Cladding, or cladding segment, refers to that portion of the optical fiber surrounding the core region, and is defined to occur where the absolute magnitude of the relative refractive index is less than 0.03% and remains less than 0.03% up to the outermost radius of the silica-based part of the optical fiber, that is, up to the outermost radius of the cladding. The core ends, and the cladding begins, at a radius $R_{CORE}$, and the cladding ends at a radius $R_{CLAD}$, where $R_{CLAD} > R_{CORE}$.

"ppm", unless otherwise specifically noted otherwise, refers to parts per million by weight, or "ppm by weight", or "ppm by wt.", and a measurement in weight percent (wt %) can be converted to ppm by multiplying by a factor of 10,000.

Preferably, both the core and the cladding of the optical fiber contain an alkali metal oxide dopant. The alkali metal oxide is preferably an oxide of K, Na, Li, Cs, or Rb, or a mixture thereof; more preferably the alkali metal oxide is $K_2O$, $Rb_2O$, $Cs_2O$ or mixtures thereof; and most preferably the alkali metal oxide is $K_2O$ or $Rb_2O$. It is beneficial, and therefore preferable, to have the peak alkali metal oxide concentration in a single mode optical fiber be substantially coincident with the peak power level of the propagating light's mode field. Preferably, the alkali metal oxide has a peak concentration in the core of the optical fiber. The alkali metal oxide concentration preferably varies radially across a radius of the optical fiber. Preferably, the concentration of alkali metal oxide generally decreases as a function of increasing radius from the centerline of the optical fiber along at least a portion of the optical fiber radius. Preferably, the alkali metal oxide concentration as a function of radius has an approximately Gaussian shape.

Preferably, the peak concentration of alkali metal oxide in the core of the optical fiber is greater than about 0.001 wt. % but less than about 1 wt. %; more preferably greater than about 0.001 wt. % but less than 0.4 wt. %; most preferably greater than about 0.001 wt. % but less than about 0.15 wt. %; and even more preferably between about 0.005 wt. % and 0.15 wt. %. The peak amount of alkali metal oxide in the cladding of the optical fiber is preferably less than the peak amount of alkali metal oxide in the core. Preferably, the peak amount of alkali metal oxide in the cladding is greater than about 0.0005 wt. %; more preferably the peak amount of alkali metal oxide in the cladding is greater than about 0.001 wt. %. The concentration of alkali metal oxide comprising a single mode optical fiber at a radius equal to the mode field radius is, in some embodiments, at least about 0.0001 wt. %; more preferably between about 0.0001 wt. % and 0.0005 wt. %. For multimode optical fiber the amount of alkali metal oxide at the core-cladding interface of the optical fiber is preferably at least about 0.001 wt. %; more preferably between about 0.001 wt. % and 0.005 wt. %. Either the core, or the cladding, or both the core and the cladding may comprise an alkali metal oxide dopant and one or more glass modifying dopants such as, for example, $GeO_2$ or F. In preferred embodiments, the multimode fiber comprises a core having a graded refractive index profile.

FIG. 1 shows an exemplary refractive index profile 10 of a single mode optical fiber having a single core segment, as well as an exemplary alkali metal oxide concentration profile 12 (alkali metal oxide concentration as a function of radius) which may be achieved by practicing the present invention. The optical fiber includes a central core segment 14 and a cladding segment 16. Preferably, the alkali metal oxide concentration varies as a function of radius. Preferably, the concentration of alkali metal oxide generally decreases as a function of increasing radius from the centerline of the optical fiber along at least a portion of the optical fiber radius. Preferably, the alkali metal oxide concentration as a function of radius has an approximately Gaussian shape. Core segment 14 of the optical fiber may have a step shape as shown in FIG. 1, or core segment 14 may have a rounded, alpha or triangular shape.

Figure 2:
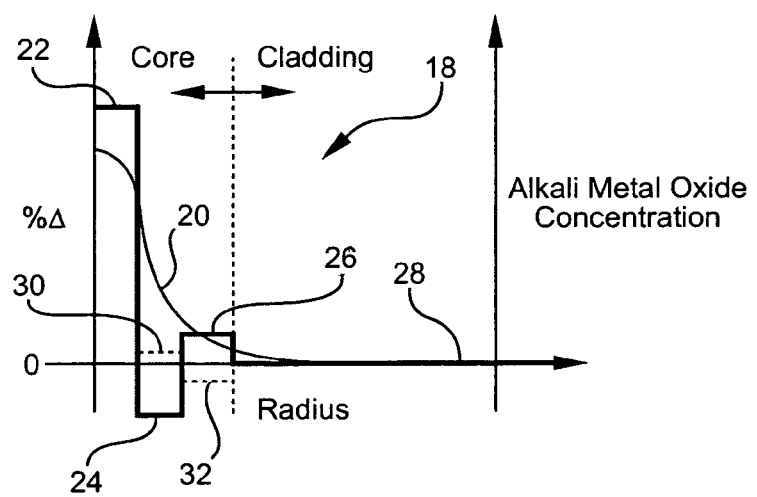
FIG. 2 is an illustration of an optical fiber refractive index profile having multiple core segments and which is compared to the radially varying concentration of alkali metal oxide in the fiber.

FIG. 2 shows an exemplary refractive index profile 18 for an optical fiber having multiple core segments (a segmented core structure), and also depicts an alkali metal oxide concentration profile 20 of the multi-segmented core optical fiber as a function of radius which may be achieved by practicing the present invention. Preferably, the concentration of alkali metal oxide generally decreases as a function of increasing radius from the centerline of the optical fiber along at least a portion of the optical fiber radius. Preferably, the alkali metal oxide concentration as a function of radius has an approximately Gaussian shape. The refractive index profile 18 preferably includes a central core segment 22, a first annular core segment 24, and a second annular core segment 26. Also shown is a cladding segment 28. However, it should be understood that the present invention is not limited to the refractive index profiles depicted herein. A core segment may have a refractive index equal to the refractive index of pure silica, greater than the refractive index of pure silica, or the segment may have a refractive index less than pure silica. As an illustration, FIG. 2 shows a first annular segment 24 that is depressed below the refractive index of pure silica (pure silica is represented by a % Δ of zero). The first annular core segment 24 may optionally have a refractive index greater than the refractive index of pure silica as indicated by line 30, or the first annular segment 24 may have a refractive index equal to pure silica. The second annular segment 26 depicted in FIG. 2 shows a relative refractive index greater than pure silica. The second annular segment 26 may optionally have a refractive index less than pure silica, indicated by line 32. Alternatively, the second annular segment 26 can be omitted altogether. Although the core of the optical fiber depicted in FIG. 2 is shown with 3 segments, the core of the optical fiber according to the present invention may have any number of segments. A core segment may have a step refractive index profile, an alpha refractive index profile, a triangular refractive index profile, a rounded refractive index profile or a combination thereof. It should also be noted that the alkali metal oxide in the concentrations disclosed herein has a minimal affect on refractive index, allowing the alkali metal oxide to be diffused across an entire core refractive index profile without appreciably affecting the existing refractive index profile. This provides tremendous flexibility to manufacturing processes, as the alkali metal oxide may be applied to an entire optical fiber, if need be, without excessive concern regarding changes to the performance attributes of the optical fiber due to refractive index changes.

FIG. 3 shows the refractive index profile 34 for another segmented core single mode optical fiber. The refractive index profile of FIG. 3 comprises a central core segment 36 having an alpha or rounded refractive index profile, and includes a first annular core segment 38 and a cladding segment 40. First annular core segment 38 may have a refractive index equal to pure silica, or the first annular core segment 38 may optionally have a refractive index greater than pure silica, as indicated by line 42. Refractive index profile 34 optionally comprises a second annular core segment 44. Second annular core segment 44 is shown in FIG. 3 as having a rounded profile. However, it should be understood that other shapes are also possible, such as for example, square, triangular or alpha. FIG. 3 also shows an exemplary distribution 45 of alkali metal oxide as a function of radius which may be achieved by practicing the present invention. Preferably, the concentration of alkali metal oxide generally decreases as a function of increasing radius from the centerline of the optical fiber along at least a portion of the optical fiber radius. Preferably, the alkali metal oxide concentration as a function of radius has an approximately Gaussian shape.

FIG. 4 depicts a refractive index profile 46 for a step index optical fiber formed by lowering the refractive index of the cladding glass by doping the cladding glass with a suitable index lowering dopant. A suitable refractive index lowering dopant, for example, is F. The optical fiber of FIG. 4 comprises a core segment 48 and a cladding segment 50. Core segment 48 may have a peak refractive index greater than pure silica, less than pure silica, or equal to pure silica. The refractive index of cladding segment 50 is less than pure silica and, of course, less than the core 48. Also shown in FIG. 4 is an exemplary concentration distribution 52 of alkali metal oxide which may be achieved by practicing the present invention. Preferably, the concentration of alkali metal oxide generally decreases as a function of increasing radius from the centerline of the optical fiber along at least a portion of the optical fiber radius. Preferably, the alkali metal oxide concentration as a function of radius has an approximately Gaussian shape.

Although FIGS. 1-4 illustrate a generally Gaussian profile for the amount of alkali metal oxide in the example optical fibers, other radially varying alkali metal oxide concentrations are possible. For example, the amount of alkali metal oxide dopant could vary linearly with radius, or in a step-wise fashion.

Figure 5:
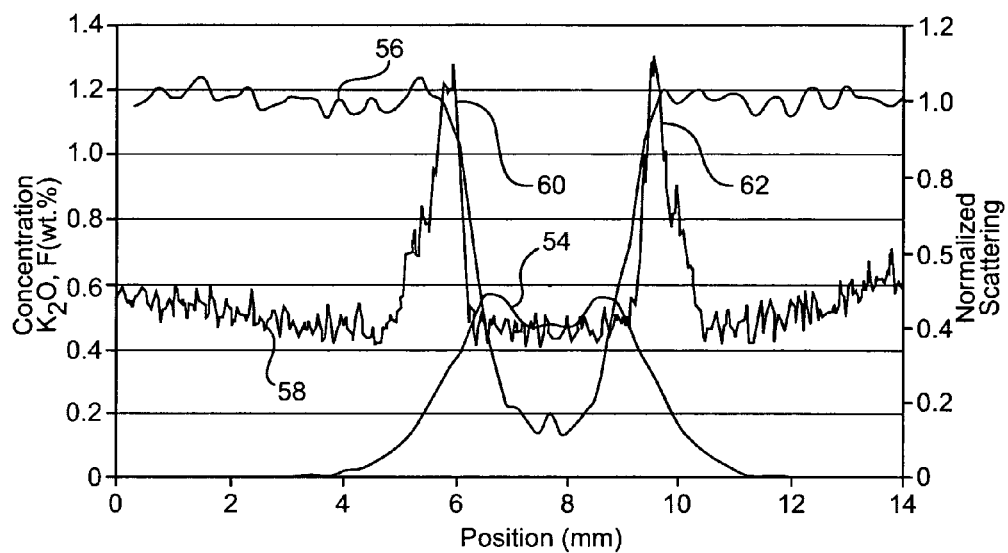
FIG. 5 is a plot of the scattering loss of a silica glass rod doped with both F and $K_2O$ showing the concentrations of the F and $K_2O$ as a function of distance across the rod.
Figure 6:
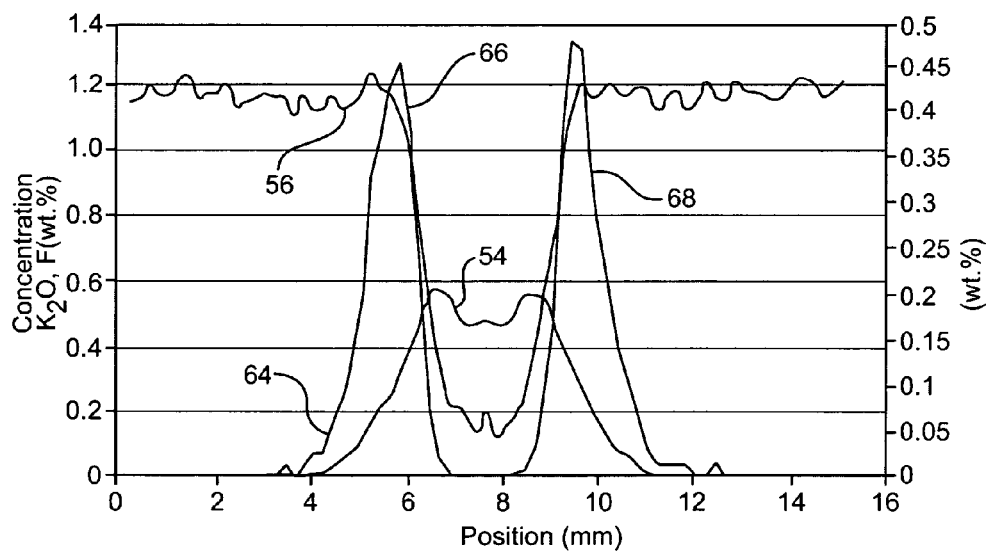
FIG. 6 is a plot of the concentrations of FIG. 5, and including a curve representing the function $[K]*[F]^3$.

It has been discovered by the inventors herein that scattering loss in silica glass doped with an alkali metal oxide and F, and wherein the concentrations of alkali metal oxide and F overlap, follows the relationship $[A]*[F]^3$, where $[A]$ represents the concentration of the alkali metal oxide (in wt. %) and $[F]$ represents the concentration of fluorine, F, (in wt. %). That is, the relation $[A]*[F]^3$ may be used to predict regions of increased or decreased scattering. FIG. 5 shows a concentration of $K_2O$ and F, 54, 56 respectively, across a portion of a diameter of a silica glass rod. Also shown in FIG. 5 is the optical scattering 58 measured across a portion of a diameter of the glass rod. The scattering peaks 60, 62 indicating large scattering losses are clearly visible. FIG. 6 again shows the concentrations 54, 56 of $K_2O$ and F depicted in FIG. 5. Also shown in FIG. 6 is the relationship $[K]*[F]^3$ where $[K]$ represents the concentration of potassium oxide ($K_2O$). $[K]*[F]^3$ is indicated by curve 64. As can be seen by comparing FIGS. 5 and 6, the scattering peaks 60, 62 in FIG. 5 coincide with the peaks 66, 68 represented by the relationship $[A]*[F]^3$ in FIG. 6. The increase in scattering which occurs in regions of overlap between an alkali metal oxide and F may be especially troublesome for regions of an optical fiber wherein the overlap is coincident with propagating light, such as, for example, within the mode field radius of the optical fiber.

Figure 7:
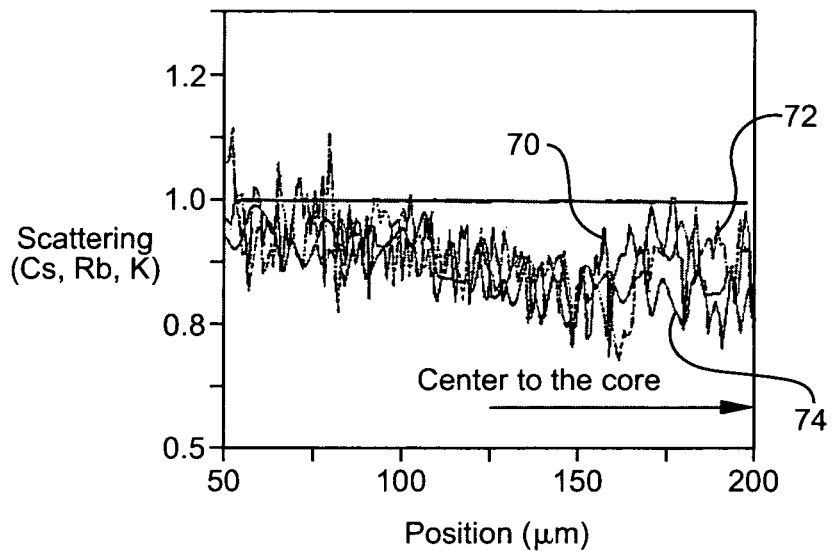
FIG. 7 is a plot of the scattering for two glass core rods containing different alkali metal oxide dopants, $Cs_2O$ and $Rb_2O$, and F, and one glass core rod containing $K_2O$ only.
Figure 8:
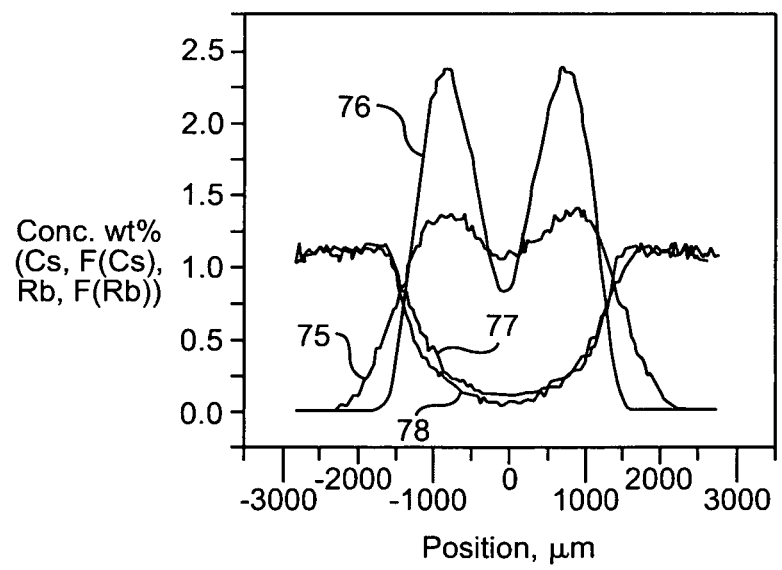
FIG. 8 is a plot of the concentrations of the $Cs_2O$, $Rb_2O$ and F from FIG. 7.

The inventors herein have also discovered that the overlapping use of F in combination with $Cs_2O$ or $Rb_2O$ does not appear to result in the same increase in scattering as demonstrated by the combination of $K_2O$ and F. FIG. 7 illustrates scattering across a radius of three optical fiber core rods. By core rod we mean a glass rod which comprises at least a portion of the core glass for an optical fiber which may later be drawn from an optical fiber preform comprising the glass rod. The core rod may optionally include a portion of the cladding for an optical fiber. A first core rod was doped with F and $Rb_2O$. Scattering for the core rod containing $Rb_2O$ is indicated by curve 70. A second core rod was doped with F and $Cs_2O$. Scattering for the core rod containing $Cs_2O$ is indicated by curve 72. The third core rod was doped with $K_2O$ only. Scattering for the core rod containing $K_2O$ is indicated by curve 74. As shown, scattering for the core rods comprising either $Cs_2O$ or $Rb_2O$ was at a level which is equivalent to the scattering displayed by the core rod containing only $K_2O$. FIG. 8 indicates the concentrations of $Rb_2O$ (75), $Cs_2O$ (76) and F (77, 78 respectively) comprising the first and second core rods. The values on the scattering axis in FIG. 7 are shown normalized to the scattering in pure silica.

In one embodiment according to the present invention, a single mode optical fiber preferably has a zero dispersion wavelength, $\lambda_0$, between about 1280 nm and 1340 nm, a zero dispersion slope, $S_o$, less than about 0.07 ps/nm²/km, and a total dispersion greater than about 15 ps/nm/km at 1550 nm, more preferably between about 15 ps/nm/km and 20 ps/nm/km at 1550 nm. Preferably, the optical fiber has a cutoff wavelength less than about 1300 nm. Preferably the optical fiber has an effective area greater than about 80 µm² at 1550 nm. The optical fiber preferably has a core diameter greater than about 3 µm, more preferably between about 3 µm and 5 µm, and a mode field diameter greater than about 9 µm, more preferably between about 10 µm and 11 µm at 1550 µm. By including an alkali metal oxide in accordance with the invention, optical fibers may be made which have an attenuation less than about 0.30 dB/km at 1310 nm and less than about 0.18 dB/km at 1550 nm; more preferably less than about 0.17 dB/km at 1550 nm, and most preferably less than about 0.16 dB/km at 1550 nm.

In another embodiment, the single mode optical fiber has a zero dispersion wavelength, $\lambda_0$, preferably in the range between about 1330 nm and 1600 nm, and more preferably between about 1330 nm and 1450 nm. The core, or the cladding, or both the core and the cladding may additionally be doped with other glass modifying dopants such as, for example, $GeO_2$ or F. The optical fiber according to the present embodiment has a dispersion slope, $S_o$, at the zero dispersion wavelength which is preferably less than about 0.07 ps/nm²/km, more preferably between about 0.035 ps/nm²/km and 0.07 ps/nm²/km, and a total dispersion greater than about 6 ps/nm/km at 1550 nm, preferably between about 6 ps/nm/km and 15 ps/nm/km at 1550 nm. Preferably the optical fiber has a cutoff wavelength less than about 1400 nm; more preferably less than about 1300 nm. Preferably the optical fiber has an effective area between about 45 µm² and 75 µm² at 1550 nm. Using the alkali metal oxide doping technique disclosed herein, optical fibers according to the present embodiment can be made which exhibit an attenuation less than about 0.30 dB/km at 1310 nm and less than about 0.18 dB/km at 1550 nm; more preferably less than about 0.17 dB/km at 1550 nm, and most preferably less than about 0.16 dB/km at 1550 nm.

In still another embodiment in accordance with the invention, a single mode optical fiber has a zero dispersion wavelength preferably between about 1350 nm and 1450 nm, a zero dispersion slope less than about 0.10 ps/nm²/km, more preferably between about 0.035 ps/nm²/km and 0.10 ps/nm²/km; and a total dispersion between about 1 ps/nm/km and 6 ps/nm/km at 1550 nm. The optical fiber preferably has a cutoff wavelength less than about 1400 nm and preferably less than about 1300 nm. Preferably, the optical fiber has an effective area between about 45 µm² and 75 µm² at 1550 nm. Using the alkali metal oxide doping techniques disclosed herein, optical fibers according to the present embodiment can be made which exhibit an attenuation less than about 0.30 dB/km at 1310 nm and less than about 0.18 dB/km at 1550 nm; preferably less than about 0.17 dB/km at 1550 nm; more preferably less than about 0.16 dB/km at 1550 nm.

In yet another embodiment, the core of an optical fiber comprises an alkali metal oxide, and the cladding of the optical fiber comprises both an alkali metal oxide and F. Preferably the alkali metal oxide is selected from the group consisting of $K_2O$, $Na_2O$, $Li_2O$, $Rb_2O$, $Cs_2O$ and mixtures thereof; more preferably the alkali metal oxide is selected from the group consisting of $K_2O$, $Rb_2O$ and $Cs_2O$ and mixtures thereof; and most preferably the alkali metal oxide is $K_2O$ or $Rb_2O$. The peak amount of alkali metal oxide in the core of the optical fiber is preferably greater than about 0.001 wt. % but less than about 0.4 wt. %; more preferably greater than 0.001 wt. % but less than about 0.15 wt. %; and most preferably between about 0.005 wt. % and 0.15 wt. %.

As may be appreciated by those skilled in the art, the ability to control the relative amount of alkali metal oxide in the preform during manufacture of the preform, and subsequent forming of the optical fiber, is important to the ultimate alkali metal oxide distribution in the optical fiber, and therefore its propagation characteristics. This may be accomplished by heat treating the preform according to a pre-determined schedule of time and temperature prior to drawing the preform into optical fiber. In some cases it is desirable to retain the alkali metal oxide in the core of the optical fiber and limit the diffusion of the alkali metal oxide into the cladding. This may be achieved by forming a substantially chlorine-free optical fiber core preform surrounded by a F-doped cladding glass, and heat treating the optical fiber preform before drawing the optical fiber preform into an optical fiber. For example, $K_2O$ has been found to diffuse approximately 10 times to 100 times faster in consolidated F-doped silica glass than in pure silica glass when heat treated within a temperature range from about 1000° C. to 1600° C. Thus, heat treating an optical fiber core preform having a cladding comprising F may advantageously result in a rapid diffusion of $K_2O$ throughout the cladding glass, but at a very low concentration relative to the concentration of alkali metal oxide in the core of the optical fiber preform. Accordingly, low scattering in the core of an optical fiber drawn from the preform may be achieved while avoiding the high scattering that may accompany concentrations of both F and $K_2O$ which are similar in magnitude and co-located within the same region of the optical fiber. Preferably, the preform is heat treated for at least 6 hours at a temperature of at least about 1000° C. more preferably the preform is heat treated at a temperature of at least about 1400°; and most preferably the preform is heat treated at a temperature of at least about 1600° C. The preform is more preferably heat treated for at least 30 hours. Preferably, a cladding of the optical fiber preform comprises F. After heat treating, the optical fiber preform may be drawn into an optical fiber by conventional drawing techniques.

Figure 9:
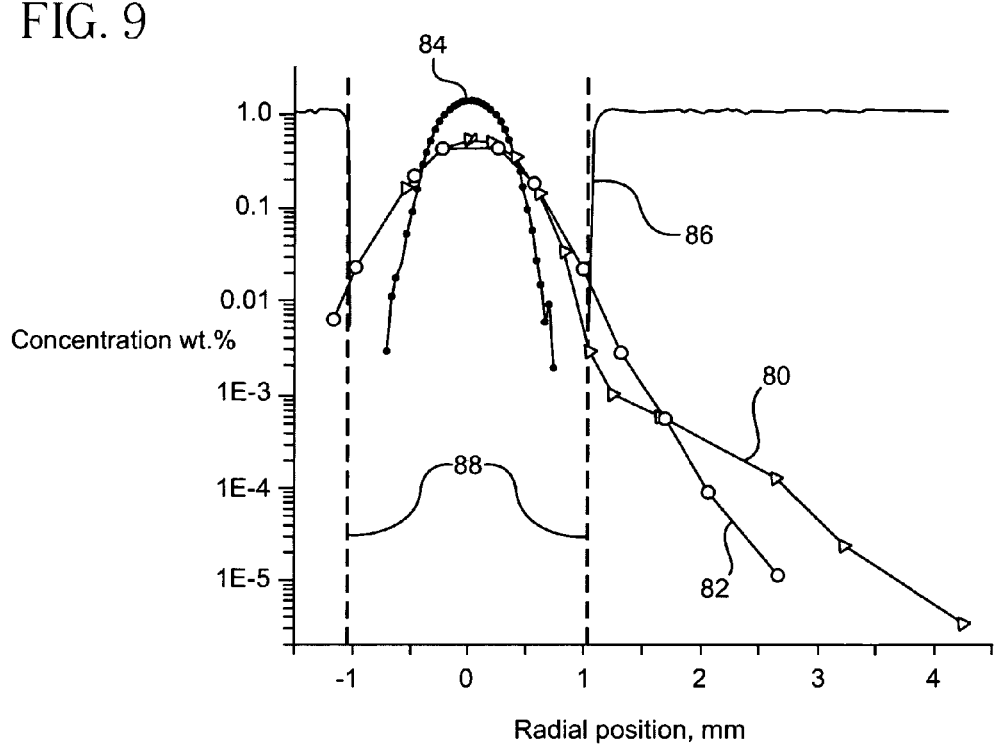
FIG. 9 is a plot showing the concentration of $K_2O$ resulting from two different diffusion methods as a function of radius across an optical fiber preform.
Figure 10:
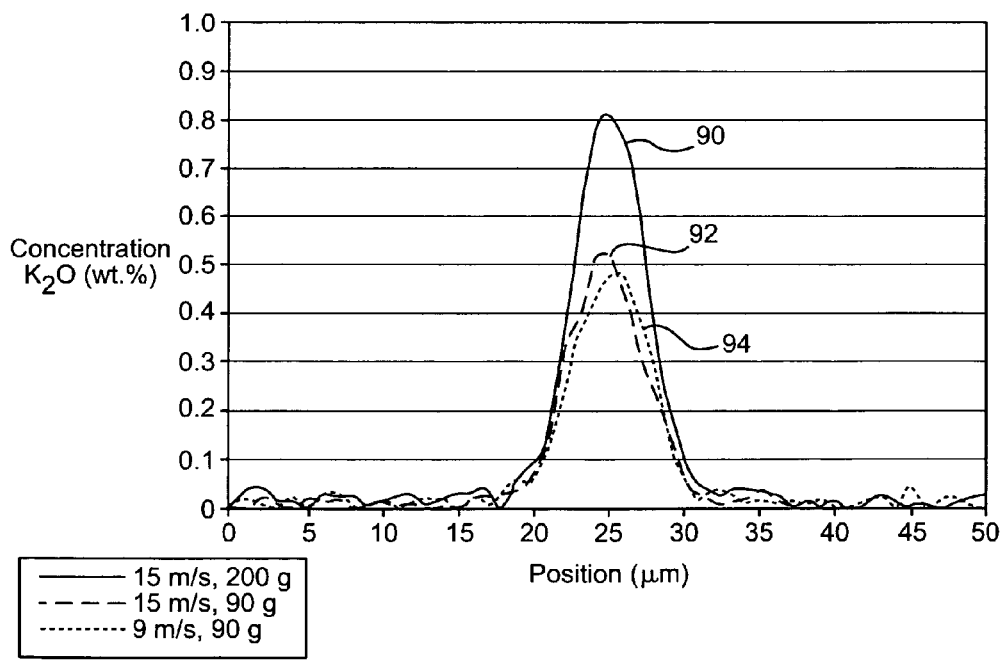
FIG. 10 illustrates the concentrations of $K_2O$ across a portion of three optical fibers after the optical fibers were drawn at pre-determined tension and draw speed.

The diffusion of an alkali metal oxide may also be advantageously controlled during the draw process. It has been found that by varying draw conditions in a prescribed manner, alkali metal oxide dopants may be distributed throughout the preform in a desired concentration profile. Preferably, the alkali metal oxide dopant is diffused in a relatively linear relationship with respect to radius. A comparison between the pre-draw heat treating approach described supra and the draw approach is illustrated in FIG. 9. FIG. 9 shows the radial concentration of $K_2O$ as a result of pre-draw heat treating of an optical fiber preform after 6 hours at 1500° C., indicated by curve 80, and the concentration of $K_2O$ 82 in an optical fiber preform after drawing at 2000° C. Also shown is the estimated starting $K_2O$ concentration profile, reflected by curve 84, and the starting F concentration profile, indicated by curve 86. The core cladding interface is indicated by the dotted line 88. As clearly shown, although the pre-draw heat treating $K_2O$ concentration profile 80 shows a relatively large depletion at the core cladding interface 88, the $K_2O$ concentration profile 82 resulting from the draw process shows a more nearly linear profile. Preferably, the alkali metal oxide concentration decreases with radius. Because the diffusion of an alkali metal oxide dopant is partially dependent upon the temperature of the glass being doped, and the time the glass remains at the temperature, these same factors play a significant role in controlling the alkali metal oxide diffusion during the draw process. The time and the temperature to which an optical fiber preform (and the optical fiber drawn from the preform) are exposed during the draw process are controlled by varying the draw speed, the draw (furnace) temperature and optical fiber tension. For example, increasing the draw speed decreases the dwell time for a particular section of the optical fiber preform in the draw furnace, thus decreasing the distance which an alkali metal oxide dopant will diffuse across the optical fiber preform, and hence the drawn optical fiber. This may result in less alkali metal oxide diffusing into the cladding and, therefore, a higher alkali metal oxide concentration in the core of the optical fiber. Conversely, decreasing the draw speed increases the dwell time, and, therefore, may result in an decrease in the concentration of alkali metal oxide in the core of the optical fiber as the alkali metal oxide diffuses further into the cladding of the optical fiber. In a like manner increasing the furnace temperature may increase the diffusion rate of the alkali metal oxide, decreasing the concentration of alkali metal oxide. Consequently, draw speed and furnace temperature may be effectively used to control the diffusion, and thus the distribution of alkali metal oxide within the resulting optical fiber. The use of draw conditions to modify the alkali metal oxide concentration across a diameter of an optical fiber is illustrated by FIG. 10. FIG. 10 depicts the concentration of $K_2O$ (90, 92 and 94) as a function of position across a portion of the diameter of three optical fibers drawn from the same optical fiber preform after drawing. The optical fiber indicated by the reference numeral 90 was drawn at 15 m/s and 200 g tension. The optical fiber indicated by reference numeral 92 was drawn at 15 m/s and 90 g tension, and the optical fiber indicated by reference numeral 94 was drawn at 9 m/s and 90 grams tension. A comparison between the $K_2O$ concentrations 90, 92, 94 shown in FIG. 10 shows that a reduction in draw speed from 15 m/s to 9 m/s, indicated by curves 92 and 94 respectively, resulted in a reduction in the peak concentration of $K_2O$. More dramatically, an increase in draw tension from 90 g to 200 g, as shown by comparing curves 92 and 94 with curve 90, shows an approximately 30% increase in the peak amount of alkali metal oxide in the core of the optical fiber represented by curve 90. It is believed that the $K_2O$ diffused radially outward from the central region of the optical fiber into the cladding of the optical fiber. Although an increase in the $K_2O$ concentration in the cladding is not directly evident from FIG. 10, we believe improvements to measurement sensitivity and subsequent measurement scans across the entire optical fiber diameter will show such an increase.

Figure 11:
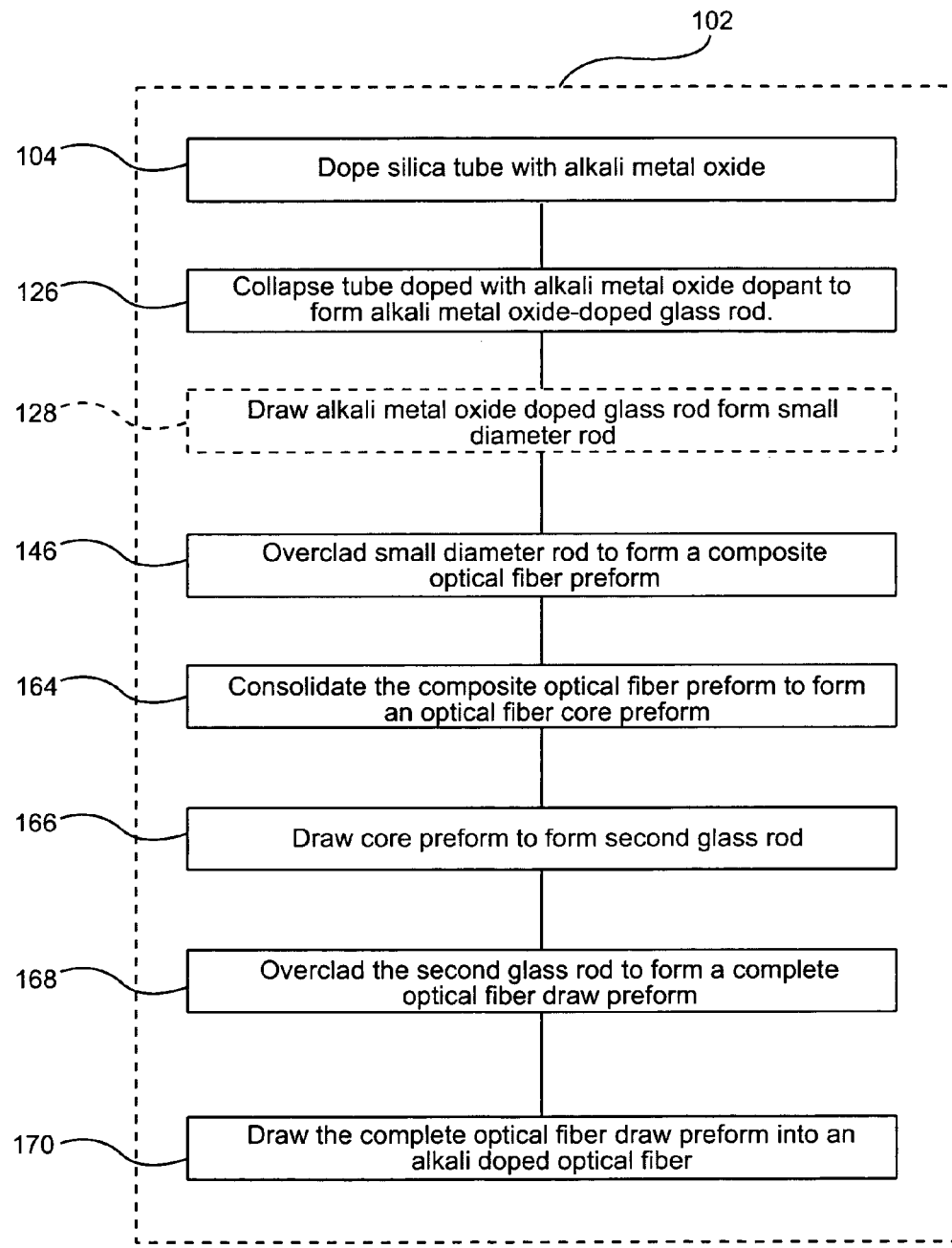
FIG. 11 illustrates a method of manufacturing an alkali metal oxide-doped optical fiber according to the present invention.

Illustrated in FIG. 11 is a first method 102, in accordance with embodiments of the present invention, for producing an alkali-doped optical fiber by diffusing an alkali metal oxide into a suitable silica glass article that is a precursor to an optical fiber. A first step 104 of the method 102 is shown and described with reference to FIGS. 11 and 12. A silica glass tube 106 suitable for the manufacture of optical fiber is preferably first mounted between chucks in a lathe 101 (such as a glass-working lathe or a conventional modified chemical vapor deposition (MCVD) glass-forming lathe). A preferably annular reservoir 108 for receiving an alkali metal source compound 110 is formed near one end of tube 106 by forging two annular neck-like deformations 112 in the wall of tube 106 by flame working or otherwise welding the reservoir to the tube. Other types of reservoir may be also used. Preferably, the annular neck-like deformations 112 are about 2 cm from each other. Tube 106 may also comprise dopants, either singly or in combination. Such dopants may include, for example, F, $Al_2O_3$, CaO, $GeO_2$, P or other refractive index modifying dopants. In particular, the tube may comprise $SiO_2$ doped with $GeO_2$ to form a portion of the core of a step index single mode fiber, for example. Prior to diffusing an alkali metal oxide into the tube, additional silica glass may be added to the interior surface of glass tube 106 through chemical vapor deposition. Such additional glass may also contain dopants as mentioned above. However, to prevent crystallization of the alkali metal, it is desirable that tube 106, and any additional glass deposited on the inside of tube 106, be essentially chlorine free. By essentially chlorine free we mean exhibiting a chlorine content sufficiently low that optical losses due to alkali chloride crystallization are avoided. A chlorine content preferably less than about 500 ppm by weight is desired for this purpose; more preferably less than about 100 ppm by wt.; and most preferably less than about 50 ppm by wt. In addition, silica glass tube 106, and any additional glass deposited therein, should be essentially free of "water". By "water" we mean the hydroxyl group OH. Water is responsible for an absorption peak at or about 1383 nm and which absorption peak may extend into the operating wavelength regions of an optical fiber. This peak may have a detrimental effect on the fiber attenuation. Therefore, it is desirable to reduce the absorption peak, also referred to as the water peak, by reducing the OH content of the glass as much as possible. Preferably, glass tube 106 contains less than about 100 ppb by wt. OH; and more preferably less than about 20 ppb by wt. To ensure that starting glass articles are essentially free from water prior to diffusing an alkali metal oxide dopant, conventional chlorine drying techniques may be employed during manufacture of the silica glass tube. The use of chlorine, however, should be minimized to reduce chlorine concentrations in the glass. In the case of porous soot glass articles, drying is preferably accomplished by exposing the article to a fluorine-containing atmosphere (fluorine sweeping), such as, for example, $CF_4$ or $SiF_4$, or combinations thereof, either after chlorine drying or in place of it. The exposure to a fluorine-containing atmosphere (fluorine sweep) is done at temperatures preferably less than about 1100° C. to avoid doping the glass with high levels of fluorine. Low levels of fluorine doping are desirable, i.e., 0.1 to 0.4 wt. % fluorine, for example. Preferably, the water content of the glass which will become the core of an optical fiber is less than about 100 ppb by wt., and more preferably less than about 20 ppb by wt.

Referring again to FIG. 12, once the silica glass tube 106 has been prepared, including any deposition of additional glass, alkali source compound 110 is introduced into tube 106 at reservoir 108 and heated by heat source 114 to form a vapor as tube 106 is rotated. Oxygen or a carrier gas is flowed into the inlet 116 of tube 106 through rotating seal 118, and portion 120 of tube 106 downstream of the alkali metal oxide source compound 110 is heated to facilitate diffusion of the alkali metal oxide into interior surface 122 of tube 106. Preferably, the tube 106 does not have any preform components inserted therein, such as another glass rod or the like. The portion 120 of tube 106 downstream of the alkali metal oxide source compound 110 should be heated to a temperature sufficient to promote rapid diffusion of the alkali into surface 122 and to prevent devitrification of the glass. Preferably, portion 120 of tube 106 downstream of alkali metal oxide source compound 110 is heated by heat source 124 to above 1500° C.; more preferably between about 1500° C. and 2000° C. Preferably, heat source 124 is traversed along the length of portion 120 of tube 106. Alkali metal oxide source compound 112 preferably comprises an element selected from the group consisting of K, Na, Li, Cs, and Rb. Preferably, alkali metal oxide source compound 110 is a bromide, iodide or fluoride. Most preferably, the alkali metal oxide source compound 110 is KBr, KI or $KNO_3$. The alkali metal oxide (e.g., $K_2O$, $Na_2O$, $LiO_2$, $Rb_2O$, $Cs_2O$ and mixtures thereof) is preferably diffused throughout a depth of between about 100 microns and 500 microns from the inside diffusion surface 122 of tube 106 prior to collapse of tube 106 thereby forming an alkali oxide doped glass tube. In particular, it is preferred that the diffused alkali metal oxide dopant concentration (in wt. %) in the tube varies radially. Preferably, the glass article (e.g. tube 106) is doped such that the concentration is highest on an inner half portion 107 and lower in an outer half portion 109, as shown in the enlarged view of FIG. 12. The demarcation point between the inner and outer half portions is defined by and located at half the radial thickness (illustrated by dotted line 111) of the tube 106. For example, the diffusion is preferably such that the peak concentration of alkali dopant in the outer half portion 109 is less than 50% of the peak concentration (in wt. %) of the inner half portion 107.

The diffusion process may be followed by the step of further heating tube 106 to promote a partial collapse of tube 106 by conventional methods as are known in the art (or by the dry methods described herein) to both reduce the inside surface area through which the alkali metal oxide might be lost and to thicken the layer of glass into which the alkali metal oxide has been diffused. Once the diffusion doping step, or any partial collapse of tube 106 has been completed, the diffusion surface of the tube 122 may optionally be etched with an etchant, suitable for removing silica glass, to a depth sufficient to remove unwanted impurities that may have diffused through the diffusion surface 122 of the tube. An aqueous HF solution may be used as an etchant, for example. More preferably, a fluoride gas such as, for example, $CF_4$, $SF_6$, $NF_3$, $C_2F_6$ or a mixture thereof, is employed. The amount of material removed from inner surface 122 is dependent upon processing conditions during diffusion and any partial tube collapse, but the etching conditions are preferably sufficient to result in the removal of glass from surface 122 to a depth of at least about 5 percent of the total diffusion depth of the alkali metal oxide. As shown by step 126 of method 102, once etching is finalized, silica glass tube 106 is further heated with a heat source 124 to collapse tube 106 downstream of alkali metal oxide source compound 110 and form an alkali metal oxide-doped solid glass rod 132. Collapse of tube 106 is accomplished according to conventional methods known in the art, such as heating with a suitable heat source (e.g., a torch). The solid alkali-doped glass rod 132 is then cut from that portion of glass containing alkali metal source compound reservoir 108. Preferably, the solid alkali metal oxide-doped glass rod 132 is etched with a suitable etchant to remove some or all hydrated glass which may have been formed by the torch during collapse of the tube 106. If a dry heat source is used for collapse, for example, an induction or resistance heater, a plasma torch, or a dry heat source which uses a non-hydrogen containing fuel, such as CO, then etching may not be needed. Utilizing a dry heat source for the doping and/or collapsing steps is believed to minimize re-wetting of the outside of the tube, i.e., diffusing OH (water) into the tube from the outside and may, therefore, further reduce fiber attenuation. A dry heat source is one which does not induce any appreciable OH (water) into the tube.

Figure 29:
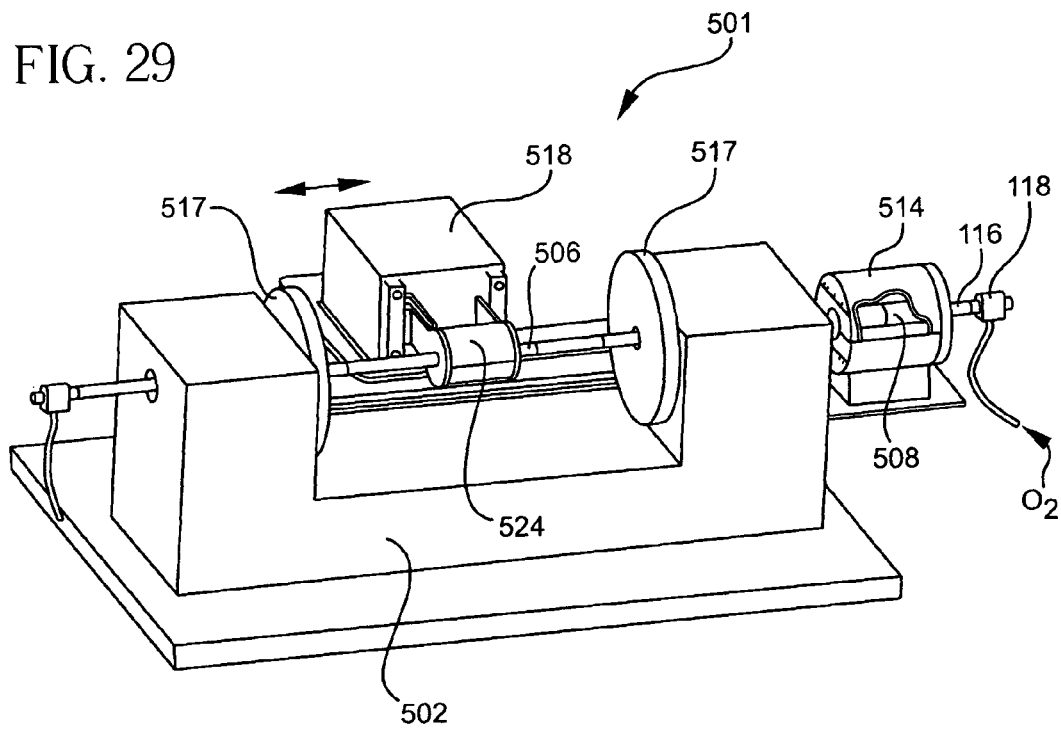
FIG. 29 is an isometric view of a lathe apparatus according to an aspect of the invention illustrating an induction heat source.

For example, FIG. 29 illustrates a diffusion doping lathe apparatus 501 for alkali doping wherein the heat source 524 for heating the tube 506 during diffusion and collapsing is an induction heater mounted proximate (and preferably surrounding) to the tube. In particular, the glass tube 506 is mounted (preferably in chucks 517) relative to the frame 502 and is rotated therein. Carrier gas (such as $O_2$) is preferably supplied from a source (not shown) and flowed into tube 506 through inlet 116 and rotatable seal 118. The carrier gas is flowed over an alkali source compound (e.g., KBr, KI or $KNO_3$) contained in vessel 508 coupled to the tube 506 by an interconnecting tube or by welding thereto. The vessel and alkali source compound are simultaneously heated (preferably to 800-1000° C.) by a heat source 514, such as a resistance or induction heater or a torch, for example which causes the alkali vapor to be entrained in the carrier gas thereby forming an alkali dopant gas. The glass tube 506 is heated by inductive heater 524 while it is exposed to the dopant gas to diffuse the alkali dopant into the glass tube 506. During the diffusion step, the heater 524 is traversed along the longitudinal direction of the rod 506 by a suitable motor and drive mechanism (not shown). Once the alkali diffusion step is complete, the glass tube 506 is collapsed by further application of sufficient heat (as described above) by heat source 524 to form an alkali doped glass rod.

Figure 30:
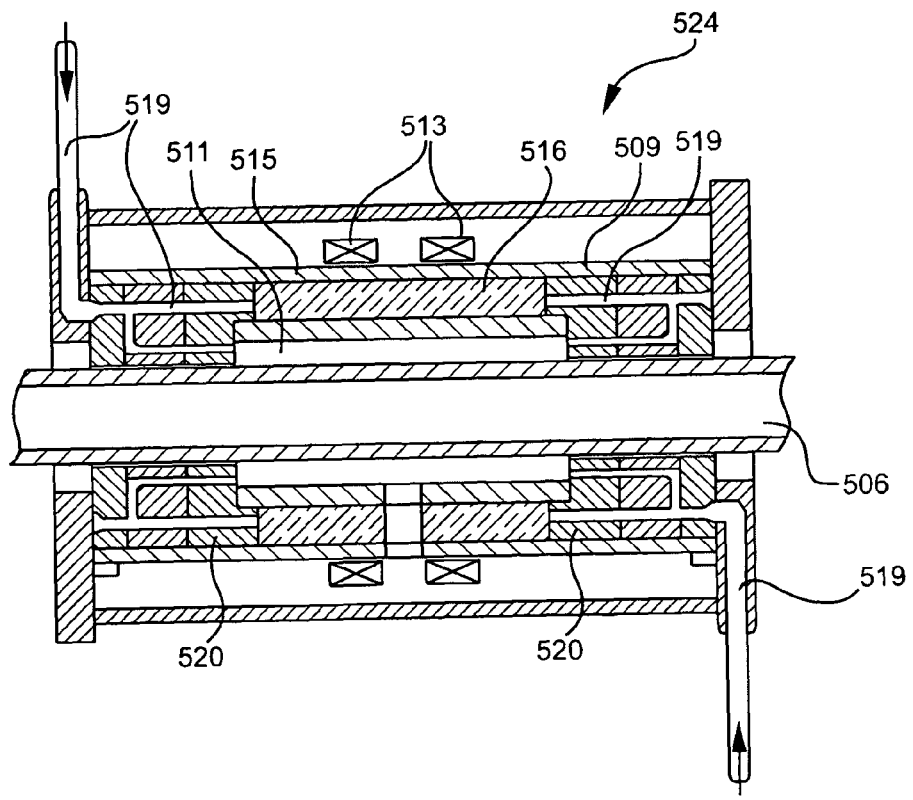
FIG. 30 is a cross sectional side view of the induction heat source of FIG. 29.

The inductive heat source 524 (as best shown in FIG. 30) includes an annular graphite susceptor 515 surrounding the glass tube 506 (shown truncated) and a coil 513 surrounding the suspector. The coil 513 is electrically connected to a tank circuit 518. The inductive heater 524 is mounted to the tank circuit 518 which moves on a slide to allow the heat source 524 to traverse the surface of the tube 506. When inductive power is supplied to the tank circuit, the coil 513 in heater 524 is energized and eddy current flow is induced in the susceptor 515 thereby heating it (and, thus, the tube 506). The susceptor is supported by and spaced from the tube by end pieces 520. A glass tube 509 preferably also surrounds the susceptor 515 acting as an electrical insulator and physical support for the assembly, and such that the susceptor may be bathed in a flow of inert gas (as indicated by arrow "I"). In particular, the susceptor 515 surrounds tube 506 and forms a first space 511 between the tube and susceptor. Likewise, a glass sleeve 509 surrounds the susceptor 515 and forms a second space 516 between the sleeve and susceptor. Inert gas, such as argon, is flowed from a source (not shown) through passages 519 which interface with, and connect to, spaces 511 and 516 thereby providing inert gas which surrounds susceptor and prevents its oxidation. Space 516 is preferably filled with porous graphite felt.

Figure 17:
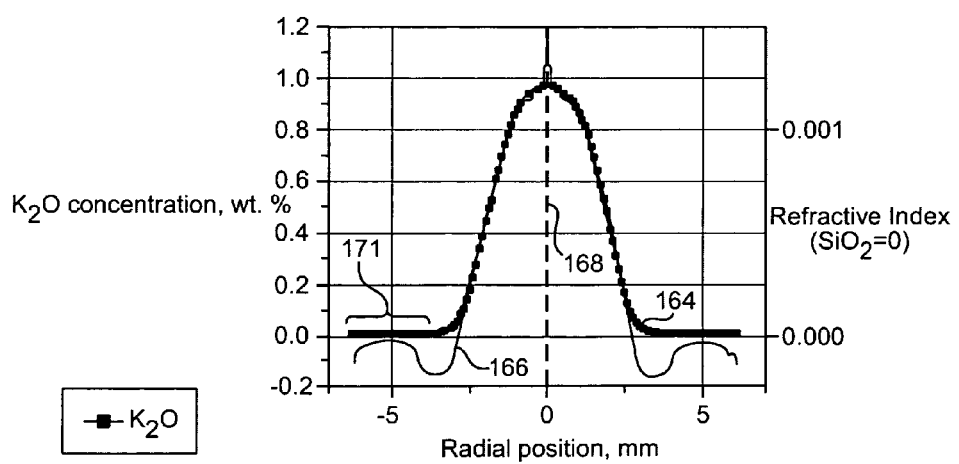
FIG. 17 is a plot of $K_2O$ concentration as a function of radius for a glass rod doped with $K_2O$ according to the present invention.
Figure 18:
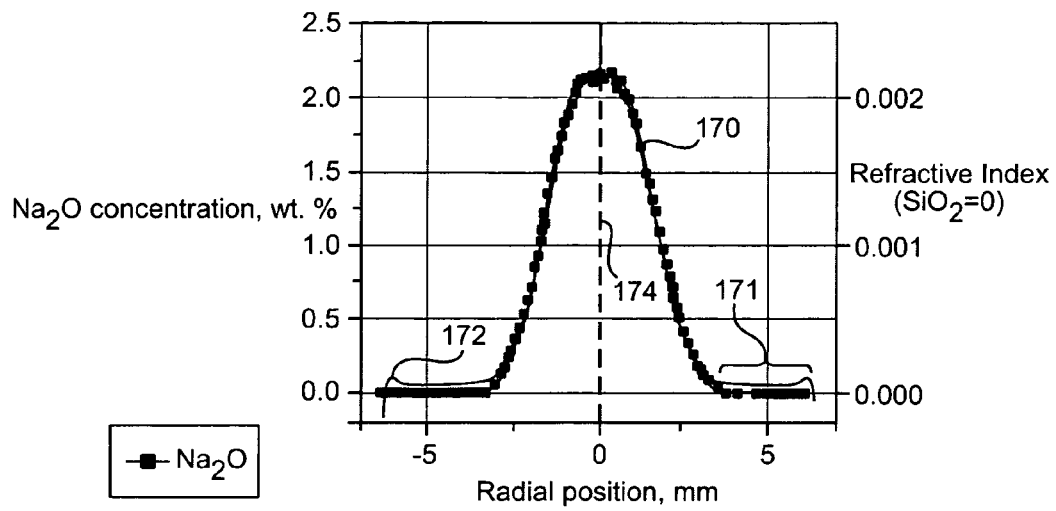
FIG. 18 is a plot of $Na_2O$ concentration diffused across a silica glass rod in accordance with the present invention as a function of radius.

It should be recognized that the alkali-doped rod 132 when collapsed preferably comprises (similar to the tube 106) concentrations of alkali metal oxide that vary radially and which are such that the portion corresponding to the inner half portion 107 has the highest peak concentration (in wt. %) of alkali dopant and the portion corresponding to the outer half portion 109 has a lower peak concentration. Most preferably, the peak concentration of alkali dopant is at the center of the rod (as shown in FIGS. 17 and 18) and the concentration at half the radius is less than 50% of the peak concentration; and more preferably less than 25%. Most preferably, an outermost radial layer 171 (FIG. 17, 18) of the rod is preferably formed without any significant alkali metal oxide dopant being present. Preferably, this outermost layer 171 devoid of alkali dopant is 1.0 mm or more thick, preferably comprising a thickness that is greater than 25% of the outer radius of the rod. It was found that having a layer on the rod without alkali dopant reduces the propensity for crystallization at the rod interface if chlorine is present in later processing.

Figure 13:
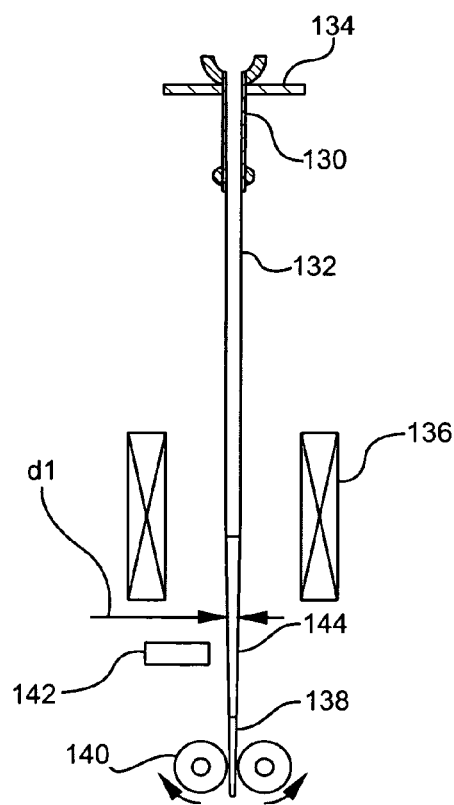
FIG. 13 illustrates a process for drawing a glass rod.
Figure 14:
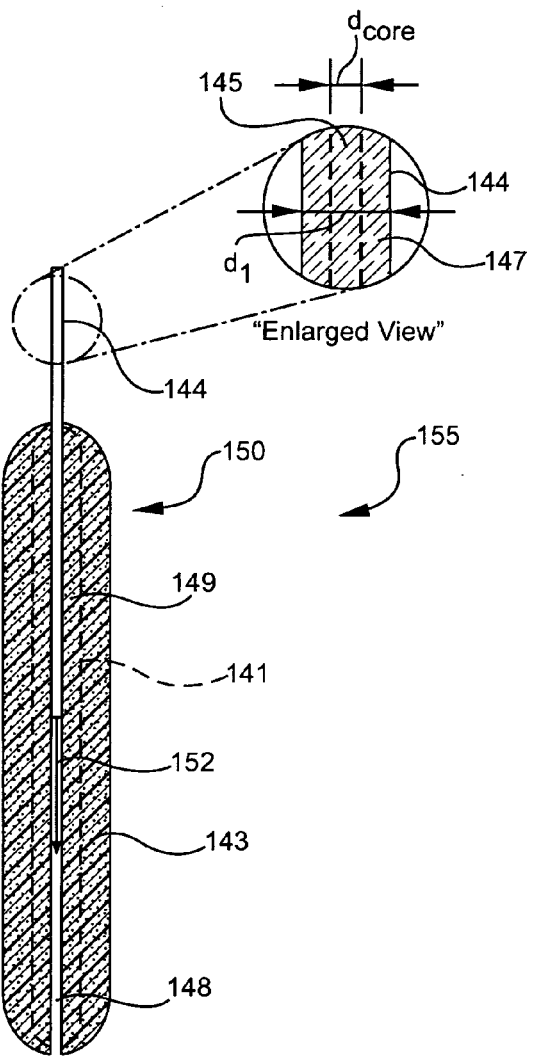
FIG. 14 depicts a method for doping an optical fiber preform with an alkali metal oxide by inserting an alkali metal oxide-doped glass rod into the centerline hole of a porous soot optical fiber preform.

According to optional step 128 of method 102, in a further process step, the alkali-doped glass rod 132 may be heated in a redraw furnace 136 and drawn into a smaller glass rod 144 having a diameter dimension smaller than the original diameter of the alkali-doped glass rod. This redraw process is illustrated in FIG. 13. A glass handle 130 is attached to the alkali-doped glass rod 132 resulting from the collapse stage described supra and the alkali-doped glass rod 132 is mounted in a moving downfeed support 134 above a conventional redraw furnace 136. A sacrificial glass rod 138, which may be attached to the bottom of alkali-doped glass rod 132, is pulled by motor-driven tractors 140, thereby causing the alkali-doped glass rod 132 to be drawn at a suitable rate. A rate of 15 to 23 cm/min has been found to be adequate, the rate being largely controlled in response to the diameter measured by sensor 142. The outer diameter dimension (d1) of the small diameter glass rod 144 resulting from the drawing process is preferably in the range of 3 mm to 10 mm; more preferably less than 6 mm in diameter dimension. If the diameter dimension of rod 132 resulting from collapse step 126 is within the desired range, rod 132 resulting from collapse step 126 may be used as glass rod 144. The small diameter glass rod 144 should have a peak concentration of $K_2O$ between about 5 times and 10 times the peak $K_2O$ concentration desired in the core of the optical fiber when the optical fiber is drawn, to offset the significant migration of the alkali dopant during draw of the fiber. For example, if the peak $K_2O$ concentration in the optical fiber core is desired to be 0.4 wt. %, the small diameter glass rod 144 preferably should have a peak $K_2O$ concentration between about 2 wt. % and 4 wt. %. In particular, having a very small diameter of the alkali-doped rod is advantageous because this concentrates the transition metal impurities present in the rod very near the fiber's centerline where their negative impact is minimized. It should be recognized that for large amounts of material added to the doped clad, the peak concentration in the fiber could be 100 times less than the peak concentration in the small diameter glass rod. As indicated by step 146 of method 102, once formed, small diameter glass rod 144, according to this method, is further overclad, for example by inserting glass rod 144 into a centerline hole of an optical fiber preform 150 to form an assembly. Preferably, the optical fiber preform 150 is porous and comprised of glass soot as illustrated in FIG. 14. In FIG. 14, small diameter alkali-doped glass rod 144 is inserted into the centerline hole 148 of a porous glass soot core preform 150, as indicated by arrow 152, to form a composite preform assembly 155. Porous soot glass core preform 150 may be made by conventional methods. For example, porous soot core preform 150 may be manufactured by the outside vapor deposition method by depositing soot onto a target rod. The target rod is removed from the porous glass soot preform, leaving a centerline hole 148 extending longitudinally through the centerline of the preform 150. Porous soot core preform 150 may comprise one or more refractive index modifying dopants such as, for example, germania ($GeO_2$). The porous soot optical fiber preform 150 may contain only core glass soot, or the porous soot optical fiber preform may comprise both core glass soot 149 and cladding glass soot 143 wherein the dividing line between the core and cladding glass soot, i.e., the substantial change in composition as measured relative to the cladding, is shown as dotted line 141 In other words, moving inwardly from the outside of the perform, the first significant change of composition signifies the start of the physical core.

Figure 15:
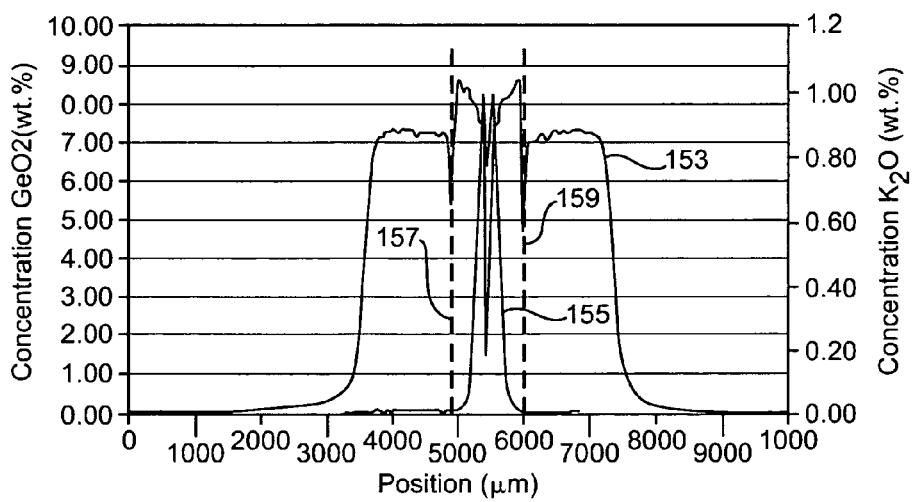
FIG. 15 depicts the concentration of $K_2O$ and $GeO_2$ across a diameter of a glass core rod.

FIG. 15 is an example of an optical fiber preform made by the method 102 described with reference to FIG. 12. In particular, a germania-doped silica soot tube is formed by conventional OVD methods, i.e., depositing germania-doped, silica-containing soot onto a rotating mandrel to form a germania-doped silica soot tube. The mandrel is removed, and the soot tube is then dried by exposing the germania-doped silica soot tube to a chlorine-containing gas atmosphere. The dried soot tube is then preferably fluorine swept (by exposure to a F-containing gas atmosphere) to remove most (and preferably substantially all) the chlorine, respectively (as described in more detail below relative to FIG. 25). The soot tube is then consolidated to form a germania-doped vitrified silica-containing glass tube having preferably greater than 4 wt. % $GeO_2$. Optionally, the glass tube may be redrawn to a smaller diameter intermediate article tube. The glass tube (or the intermediate article tube) comprising silica and germania ($GeO_2$) is then doped with an alkali metal oxide (e.g., $K_2O$) in step 104 and collapsed in step 126 to form a large diameter solid silica glass core rod doped with alkali and germania. The large diameter solid glass core rod may be further preferably redrawn in optional step 128 into a small diameter glass core rod 144 having the preferred diameter dimension (d1) described above. The small diameter glass core rod 144 comprising germania- and alkali-doped silica is then further overclad by inserting the rod into a centerline hole of a porous glass soot optical fiber preform 150 to form a composite optical fiber preform as shown in step 146 of FIG. 11. The porous soot optical fiber preform 150 is also preferably comprised of germania ($GeO_2$) doped silica soot on the inner annular portion 149 of the soot perform 150 representing the outer portion of the core and non-germania doped silica soot (preferably substantially undoped silica soot) on the outer annular portion 143 of the soot perform 150 representing part of the cladding. The composite optical fiber preform 145 was appropriately chlorine dried and consolidated in step 164 onto the small diameter glass rod to form a consolidated optical fiber preform (the details of which are supplied with reference to FIG. 25). An optional fluorine-sweep may be employed prior to consolidation to remove any residual chlorine present in the soot perform 150. The fluorine sweep is preferably performed by subjecting the preform 150 to a fluorine-containing gas (such as $SiF_4$ or $CF_4$ gas, for example) at a temperature of about 1000-1150° C. preferably for about 90-150 minutes. In addition to substantially eliminating (sweeping) the chlorine present in the soot perform, the fluorine sweep slightly dopes the inner portion with fluorine to a small wt. % of fluorine of between 0.1 and 0.4 wt. %. By consolidated we mean heating the porous glass soot to a temperature which causes the glass soot to coalesce, thereby forming a solid, clear glass. The alkali-doped core perform rod is preferably further redrawn to form a second glass core rod article 144, as shown in step 166. It should be recognized that the doped glass rod article 144 includes a first portion 145 having a diameter $d_{core}$ corresponding to the core of the fiber and which includes a large concentration of alkali dopant, and a surrounding portion 147 having the diameter d1 which corresponds to the inner part of the cladding (see enlarged view of FIG. 14). Preferably, $d_{core}$ is less than or equal to 0.5 times d1 such that some portion of the cladding is included in the rod article. Again, the second rod 144 is overclad with silica-containing glass and consolidated to form a final draw perform. Most preferably, the overclad is provided by OVD or a rod-in-soot process (where the rod is inserted into a silica-containing glass soot tube) and consolidated, but may be optionally included by inserting the rod into a glass sleeve to form a final consolidated draw perform having a final consolidated outer dimension diameter (d2). Preferably, the outer dimension (d1) of the glass article rod 144 is less than or equal to 0.06 times the final outer dimension (d2) of the final consolidated draw perform (more preferably less than or equal to 0.03 times the final outer dimension (d2)) thereby concentrating the alkali dopant (the alkali metal oxide) near the center of the perform.

The consolidated optical fiber core preform produced was measured by using an electron microprobe. The curves 153, 155 shown in FIG. 15 show exemplary concentrations of $GeO_2$ and $K_2O$ across a diameter of the consolidated preform. The lines 157 and 159 indicate the boundary between the small diameter glass rod and the consolidated soot. Upon consolidation of the final draw perform, an alkali- and germania-doped optical fiber (See FIG. 1, for example) is then drawn from the consolidated assembly in step 170 using conventional draw apparatus and methods or otherwise as described herein.

Figure 16:
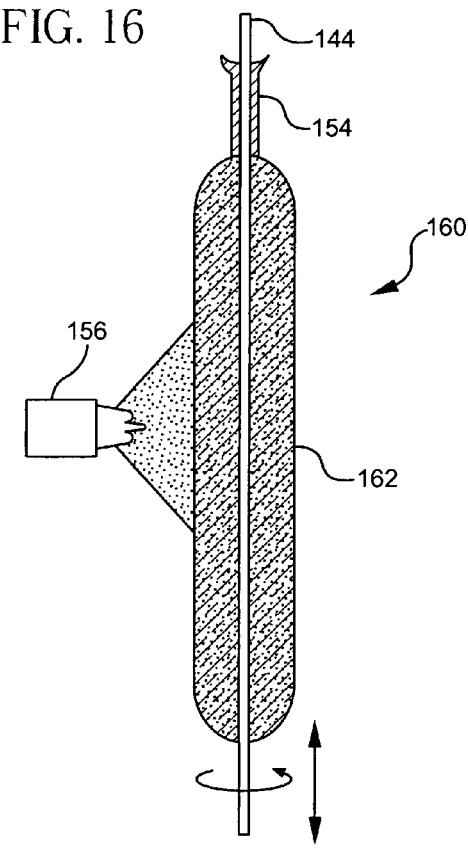
FIG. 16 shows a method of depositing glass soot.

According to an alternative method described with reference to FIG. 16, the small diameter alkali-doped glass rod 144 may be used as a starting rod upon which additional porous glass soot 162 is deposited as overclad using an OVD method, as is known in the art, to form an assembly 160. A typical outside vapor deposition method is illustrated in FIG. 16. As shown in FIG. 16, a glass handle 154 is attached to small diameter alkali-doped glass rod 144 manufactured as heretofore described and becomes an integral part of the resulting preform. Handle 154 provides a method of supporting the silica glass preform resulting from the deposition process during later processing steps. The glass rod 144 having the attached handle 154 is mounted in a lathe where it is rotated and translated with respect to burner 156 which may be, for example, of the type disclosed in U.S. Pat. No. 4,165,223. Fuel gas and oxygen, or air, are supplied to burner 156 from a source (not shown). This mixture is burned to produce a flame which is emitted from burner 156. A silica precursor gas-vapor mixture is oxidized within the flame to form a silica-containing soot stream 158 which is directed toward glass rod 144. Suitable means for delivering the gas-vapor mixture to burner 156 are well known in the art; for an illustration of such means reference is made to U.S. Pat. Nos. 3,826,560, 4,148,621 and 4,173,305. Burner 156 is generally operated under conditions that will provide acceptably high laydown rates and efficiency while minimizing the buildup of soot on the face thereof. Under such conditions, the flow rates of gases and reactants from the burner orifices and the sizes and locations of such orifices as well as the axial orientation thereof are such that a well focused stream of soot flows from burner 156 toward glass rod 144. Composite soot preform 160 is formed by traversing glass rod 144 many times with respect to burner 156 to cause a build-up of many layers of silica soot-containing to form soot coating 162. The translating motion could also be achieved by moving burner 156 back and forth along rotating glass rod 144 or by the combined translational motion of both burner 156 and glass rod 144. Soot coating 162 forms at least a portion of the core glass of the composite preform 160 which is preferably comprised of substantially pure silica. Preferably, the soot coating has a density greater than 0.35 g/cc, more preferably between about 0.35 g/cc and 0.5 g/cc. The composite preform 160 is then dried by exposing it to a chlorine-containing gas and heated in a furnace to consolidate the composite preform 160 to form a clear, solid glass consolidated optical fiber core preform indicated in step 164 of method 102.

The steps of drying and consolidating the composite preform to form an optical fiber core preform may be performed in accordance with the teachings of U.S. Pat. No. 4,165,223, or as otherwise described herein with respect to FIG. 25. During the consolidation step, the composite preform is preferably fluorine swept to remove the undesirable chlorine imparted in the initial drying process. This sweeping comprises exposure to a fluorine-containing gas but only in amounts that adds a small amount of fluorine (0.1 to 0.4 wt %), for example. The clear glass core preform may then be redrawn in a process similar to that process described supra and shown in step 166 of method 102 to form a second core rod, i.e. a glass rod which contains at least a portion of the core of an optical fiber drawn therefrom. The second core rod may include at least a portion of the cladding glass also. As shown by step 168 of method 102, the second core rod may be further processed by adding additional glass, either by sleeving with a glass tube (either a glass tube or soot tube), through depositing glass soot by chemical vapor deposition, for example, by both sleeving and chemical deposition, or through other methods as are known in the art, to form a complete optical fiber preform ready to be drawn into an optical fiber. The additional glass may comprise core glass, cladding glass or both core and cladding glass. Further, the additional glass may take several additional deposition steps to achieve the desired thickness, wherein after each step, the soot is dried, fluorine doped, consolidated and redrawn into a smaller diameter rod. In the case where the core consists substantially of silica doped with alkali (which may include a small amount of fluorine), the additional glass consists of an inner radial portion of substantially undoped silica (which may include a small amount of fluorine) and an outer radial portion (corresponding to fiber cladding) of silica preferably sufficiently down doped with fluorine by flood doping (see U.S. Pat. No. 4,629,485). The doping is preferably sufficient to achieve a relative refractive index delta % between the core and the cladding of, for example, greater than 0.2%, and more preferably between 0.30% and 0.40%. In particular, for each additional step wherein moat silica (that additional glass corresponding with the cladding of the fiber) is added by deposition to the second rod, such moat silica is doped with fluorine. The moat soot is first dried by subjecting it to a chlorine-containing gas, and then exposed it to a fluorine-containing gas (e.g., $SiF_4$ or $CF_4$) for 60-120 minutes at 1225° C. and then consolidated by downdriving through the hot zone (of 1450-1500° C.) at 7-10 mm/min preferably in the presence of the fluorine-containing gas. This preform may be redrawn to form a third rod and the steps repeated again, i.e., deposition, drying, fluorine doping, and consolidation until the proper diameter final perform is achieved. Preferably, the fluorine wt. % in each successive layer of additional glass in the cladding is approximately the same or, more preferably, slightly less (approx. 0.1 to 0.5 wt % less) in the outermost cladding to minimize stress effects. After the complete optical fiber preform of step 168 is manufactured, the completed optical fiber draw preform is drawn into an alkali metal oxide doped optical fiber as indicated by step 170 of method 102. After each redraw step described herein, the rod is preferably $D_2$ treated by exposing the rod to a deuterium atmosphere. Deuterium treatment is described in GB 2,149,392 and U.S. Pat. No. 4,515,612 and U.S. Pat. No. 4,504,297.

In accordance with another method embodiment 302 described with reference to the block diagram of FIG. 25, a germania- and alkali-doped step index single mode fiber is formed. The method 302 preferably includes the steps of first forming a germania-doped silica-containing glass soot tube in step 301. Soot tube is preferably formed by OVD by depositing silica-containing soot doped with the amount of germania dopant onto a rotating mandrel such that the desired refractive index is achieved in the fiber (e.g., 0.3% to 0.4% for a step index fiber). An annular shaped soot tube is thus formed by afterwards removing the mandrel. The soot tube is then preferably dried in a drying step 303 by first preheating the perform for 60 minutes at 1000° C. in a helium environment. Next, the germania-doped silica soot tube is preferably exposed to a chlorine-containing (e.g., $Cl_2$) gas atmosphere in a furnace for about 60-120 minutes at a temperature between about 1000-1150° C. Most preferably, the atmosphere comprises a combination of helium and chlorine-containing gas wherein the volume flow of chlorine-containing gas is less than the volume flow rate of helium; preferably the volume flow of chlorine-containing gas is less than 10% of the volume flow of helium; more preferably less than 2% (for example, 20 SLPM helium and 0.2 SLPM chlorine-containing gas). Following the chlorine dry step 303, the dried soot tube is preferably also subjected to a fluorine sweep step 304 wherein the dried tube is subjected to a fluorine-containing atmosphere (preferably comprising $CF_4$ or $SiF_4$) in a furnace at a temperature between about 1000-1150° C. for a period of between about 90-150 minutes to further dry the preform. Most preferably, the fluorine containing atmosphere contains the fluorine-containing gas and an inert gas, such as helium. The volume flow of fluorine-containing gas is less than the volume flow rate of helium; preferably the volume flow of fluorine-containing gas is less than 10% of the volume flow of helium; more preferably less than 5% (for example, 20 SLPM helium and 0.4 SLPM fluorine-containing gas). This fluorine sweep treatment in step 304 is done at a temperature below the consolidation temperature where only a small weight percent (about 0.1 to 0.4 wt %) of fluorine is introduced and doped into the germania-doped silica tube. The fluorine sweep is intended to minimize the amount of chlorine remaining in the soot perform.

The dried and fluorine swept tube is preferably then consolidated in step 307 by exposing (by down driving the soot perform at about 7 mm/min) in a furnace having a hot zone temperature between about 1450 and 1500° C. and an inert gas atmosphere comprising, for example, helium. This produces a germania-doped silica glass tube which is then alkali doped as previously described with reference to FIG. 12 in step 304. Prior to such doping, the tube may optionally be placed in a redraw furnace and drawn down to form an intermediate article in the form of a smaller diameter alkali-doped tube.

Figure 27:
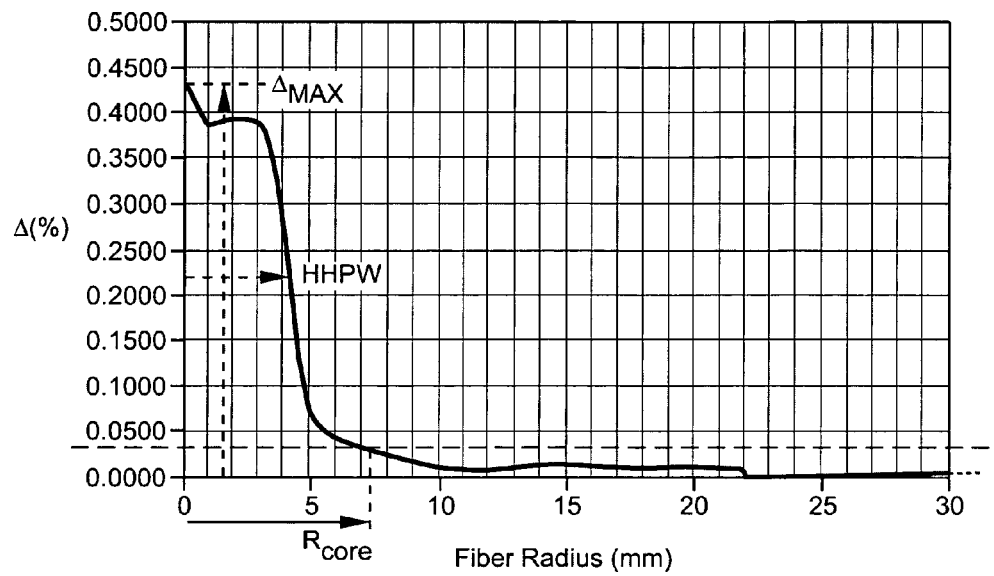
FIGS. 27-28 are illustrations of a relative refractive index profiles of alkali doped fibers in accordance with the invention.

Following the alkali doping, the glass tube or intermediate article is collapsed on the lathe by supplying sufficient heat from a heat source to form a glass article rod including silica doped with the alkali metal oxide and germania. Optionally, the rod may be redrawn in a redraw apparatus, in a step between steps 326 and 329, to an even smaller diameter rod as described above. Next additional silica-containing glass is added to the alkali-doped rod. For example, the small diameter alkali- and germania-doped rod may be inserted in step 326 into a soot preform 150 (FIG. 14) preferably having an inner annular portion 149 of germania-doped silica soot (corresponding to the outermost part of the core), and an outer portion 143 (corresponding to the cladding) preferably made of substantially pure (undoped) silica soot. This rod-in-soot tube assembly is chlorine dried and optionally fluorine swept and consolidated to form a final consolidated draw perform assembly in the same manner as described above for the germainia-doped soot tube. Finally, an alkali- and germania-doped single mode optical fiber is drawn from the consolidated draw preform; a representative refractive index profile of which is shown in FIG. 27. In the alkali-doped optical fiber 310, the core 312 consists essentially of germania, fluorine and alkali dopants whereas the cladding 316 consists essentially of undoped silica or slightly fluorine-doped silica. The maximum relative refractive index delta (AMAX) for the example fiber 310 produced was about 0.43% and the outer radius of the core 312 was about 5.3 μm.

In a first set of preferred optical fiber embodiments, optical fiber disclosed herein comprises a core and a cladding surrounding and directly adjacent the core, wherein the core has an entirely non-negative, preferably positive, relative refractive index profile relative to the cladding. Preferably, the core comprises germania.

In some preferred embodiments in the first set of preferred embodiments, the core consists of a single core segment, namely a central core segment, and a cladding surrounding and directly adjacent the central core segment, as represented by FIGS. 1 and 27 and variations of these illustrative profiles, such as profiles having a step, rounded, alpha or triangular shape, as discussed hereinabove, wherein the central core segment has a positive refractive index $\Delta_1(r)$ relative to pure silica. As seen in FIG. 27, the relative refractive index of the fiber may include a diffusion tail which extends into the cladding, where the relative refractive index has an absolute magnitude less than 0.03%. In other preferred embodiments in the first set of preferred embodiments, the core comprises multiple core segments, such as a central core segment and a first annular core segment surrounding and directly adjacent the central core segment, and a cladding surrounding and directly adjacent the first annular core segment, wherein the central core segment has a non-negative, preferably positive, relative refractive index $\Delta_1\%(r)$ relative to the cladding, and wherein the first annular core segment pure silica, has a non-negative, preferably positive, relative refractive index $\Delta_2\%(r)$ relative to the cladding.

In the first set of preferred embodiments, the core comprises an alkali metal oxide selected from the group consisting of $K_2O$, $Na_2O$, $LiO2$, $Rb_2O$, $Cs_2O$ and mixtures thereof, with a peak alkali metal oxide concentration of between 20 and 300 ppm, preferably between 20 and 200 ppm. The maximum alkali metal oxide concentration in the cladding is preferably less than 50 ppm, more preferably less than 10 ppm, even more preferably less than 5 ppm. Each of the core and the cladding comprises greater than 90 wt % SiO2, preferably greater than or equal to 95 wt % SiO2. Fabrication of an optical fiber according to one or more of the methods disclosed herein may cause a small amount of fluorine to remain in the core, for example as a result of fluorine sweeping a preform, or part of a preform, prior to introduction of an alkali metal oxide therein. The core comprises preferably less than 0.2 wt % fluorine, more preferably less than 0.1 wt % fluorine, and in some preferred embodiments comprises no fluorine. The core comprises preferably less than 3000 ppm chlorine, more preferably less than 2000 ppm chlorine, and in some preferred embodiments comprises between 500 ppm and 2000 ppm chlorine as a result of fabrication according to one or methods disclosed herein.

In some preferred embodiments of the first set, the core comprises germanium oxide and an alkali metal oxide selected from the group consisting of $K_2O$, $Na_2O$, $LiO_2$, $Rb_2O$, $Cs_2O$ and mixtures thereof, with a peak alkali metal oxide concentration of between 20 and 300 ppm, preferably between 20 and 200 ppm, and even more preferably between 30 and 150 ppm; in various preferred embodiments, the core further comprises a peak relative refractive index, $\Delta_{MAX}$, >0.2%, and in other preferred embodiments, the core further comprises a peak relative refractive index, $\Delta_{MAX}$, between 0.2 and 0.5%, and in still other preferred embodiments, the core further comprises a peak relative refractive index, $\Delta_{MAX}$, between 0.3 and 0.45%.

In other preferred embodiments of the first set, optical fiber disclosed herein comprises a single core segment, namely a central core segment, and a cladding surrounding and directly adjacent the central core segment, wherein the core has a positive refractive index $\Delta_1(r)$ relative to pure silica, and wherein the core comprises germanium oxide and an alkali metal oxide selected from the group consisting of $K_2O$, $Na_2O$, $LiO_2$, $Rb_2O$, $Cs_2O$ and mixtures thereof, with a peak alkali metal oxide concentration of between 20 and 300 ppm, preferably between 20 and 200 ppm, and even more preferably between 30 and 150 ppm; wherein the core further comprises a peak relative refractive index, $\Delta_{MAX}$, between 0.2 and 0.5%, preferably between 0.25 and 0.45%, and the maximum alkali metal oxide concentration in the cladding is preferably less than 50 ppm, more preferably less than 10 ppm, and even more preferably less than 5 ppm. The optical fiber comprises greater than 90 wt % SiO2, preferably greater than or equal to 95 wt % SiO2. The core comprises preferably less than 0.2 wt % fluorine, more preferably less than 0.1 wt % fluorine, and in some preferred embodiments comprises no fluorine. The core comprises preferably less than 3000 ppm chlorine, more preferably less than 2000 ppm chlorine, and in some preferred embodiments comprises between 500 ppm and 2000 ppm chlorine.

In still other preferred embodiments of the first set, optical fiber disclosed herein comprises a single core segment, namely a central core segment, and a cladding surrounding and directly adjacent the central core segment, wherein the core comprises germanium oxide and $K_2O$, with a peak $K_2O$ concentration of between 20 and 300 ppm, preferably between 20 and 200 ppm, and even more preferably between 30 and 150 ppm; wherein the core further comprises a peak relative refractive index, $\Delta_{MAX}$, between 0.2 and 0.5%, preferably between 0.25 and 0.45%, and the maximum $K_2O$ concentration in the cladding is preferably less than 10 ppm, more preferably less than 5 ppm. The optical fiber comprises greater than 90 wt % SiO2, preferably greater than or equal to 95 wt % SiO2. The core comprises preferably less than 0.2 wt % fluorine, more preferably less than 0.1 wt % fluorine, and in some preferred embodiments comprises no fluorine. The core comprises preferably less than 3000 ppm chlorine, more preferably less than 2000 ppm chlorine, and in some preferred embodiments comprises between 500 ppm and 2000 ppm chlorine.

In accordance with another preferred method embodiment of the invention, an optical fiber having an alkali-doped silica core and fluorine-doped cladding is manufactured. As shown in FIG. 26, the method 402 includes forming a tube consisting essentially of silica soot in step 401. The only difference between this tube and the previously described tube from step 301 of FIG. 25 is that it is preferably substantially pure (undoped) silica soot, but which may include small amounts of fluorine from fluorine sweeps to remove chlorine. The chlorine dry, fluorine sweep, consolidation, alkali doping and collapsing steps 403, 405, 407, 404, and 426 are the same as described for the method of FIG. 25, except that the resultant collapsed rod is silica doped only with alkali and a slight amount of fluorine (approx. 0.1 to 0.4 wt. %) resulting from the fluorine sweep. The rod may be optionally etched and/or may further redrawn into a smaller diameter alkali-doped rod.

Figure 28:
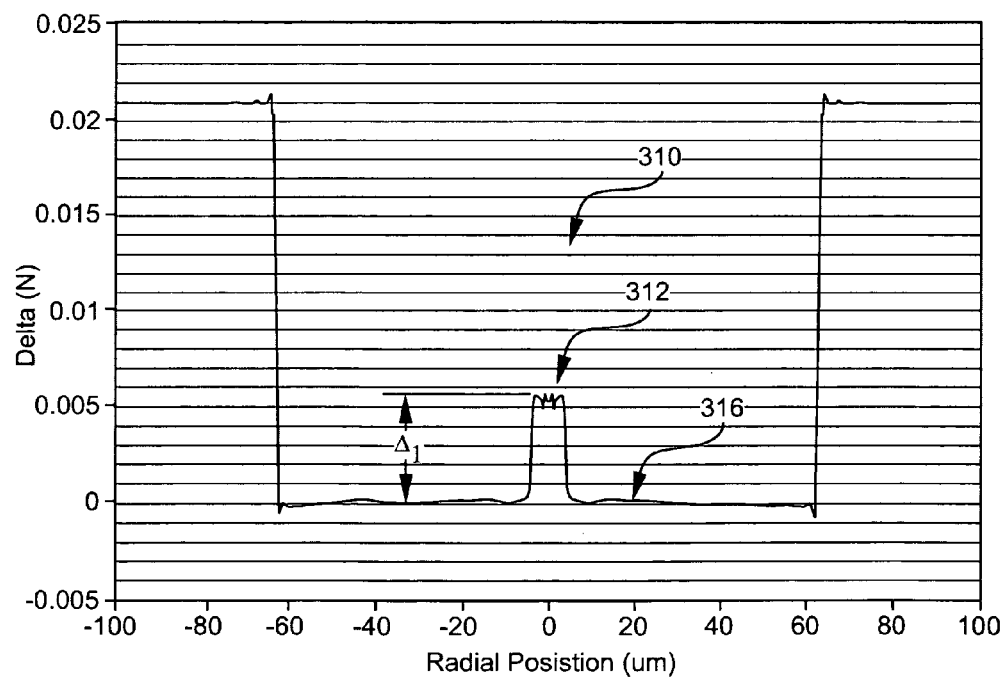

In step 429, the rod is then inserted into a silica-containing soot tube (preferably also fluorine swept) to form a rod-in-soot assembly wherein the soot tube preferably corresponds to and makes up the remaining portion of the fiber's silica core. In particular, the soot tube includes substantially the same processing and substantially the same levels of fluorine as does the rod; the rod and the tube represent each include a small weight percent of fluorine due to the fluorine sweep. This rod-in soot assembly is dried, preferably fluorine swept again, and consolidated in step 431 in the manner discussed previously for step 331 to form a consolidated assembly. This consolidated assembly is then preferably again redrawn in step 466 to a smaller diameter core rod (sometimes referred to as a cane) of about 15 mm in diameter dimension. Overclad silica soot is then added to the core cane, such as by depositing it onto the core cane by OVD in step 468. This soot is then dried, flood doped with fluorine (as taught in U.S. Pat. No. 4,629,485), and consolidated in step 467 to add additional fluorine-doped glass onto the consolidated assembly. The fluorine doping occurs in consolidation furnace by exposing the soot to a fluorine-containing gas ($SiF_4$ or $CF_4$) at a temperature of about 1225° C. for between about 60 and 120 minutes, after which the doped soot is consolidated by raising the furnace temperature to about 1450 and 1500° C. and exposing the soot to that temperature in a down drive sinter for between about 7 to 10 minutes. The fluorine gas may be stopped prior to consolidation (and only helium used) or continue to flow as the perform undergoes consolidation in combination with the helium. Steps 466, 468, and 467 are repeated in block 472 to add an additional amount of overcladding to achieve the desired core/clad ratio. A representative example fiber having an alkali-doped silica core and fluorine-doped cladding is then drawn utilizing a conventional draw apparatus and method. The fiber made in accordance with this method 402 is shown in FIG. 28. This fiber 446 includes a core 448 including alkali-doped silica and a cladding 450 of fluorine-doped silica. The core 448 includes a small wt % of fluorine from the fluorine sweep.

In a second set of preferred optical fiber embodiments, optical fiber disclosed herein comprises a core and a cladding surrounding and directly adjacent the core, wherein the core has an entirely non-negative, preferably positive, relative refractive index profile relative to the cladding. Preferably, the core contains essentially no germania, more preferably the core contains no germania.

In some preferred embodiments in the second set of preferred embodiments, the core consists of a single core segment, namely a central core segment, and a cladding surrounding and directly adjacent the central core segment, as represented by FIG. 1 and variations of the illustrative profile of FIG. 1, such as profiles having a step, rounded, alpha or triangular shape, as discussed hereinabove, wherein the central core segment has a positive refractive index $\Delta_1(r)$ relative to the cladding. In other preferred embodiments in the second set of preferred embodiments, the core comprises multiple core segments, such as a central core segment and a first annular core segment surrounding and directly adjacent the central core segment, and a cladding surrounding and directly adjacent the first annular core segment, wherein the central core segment has a non-negative, preferably positive, relative refractive index $\Delta_1\%(r)$ relative to the cladding, and wherein the first annular core segment pure silica, has a non-negative, preferably positive, relative refractive index $\Delta_2\%(r)$ relative to the cladding.

In the second set of preferred embodiments, the core comprises an alkali metal oxide selected from the group consisting of $K_2O$, $Na_2O$, $LiO2$, $Rb_2O$, $Cs_2O$ and mixtures thereof, with a peak alkali metal oxide concentration of between 20 and 1000 ppm, preferably between 20 and 700 ppm, and even more preferably between 20 and 500 ppm. The maximum alkali metal oxide concentration in the cladding is preferably less than 200 ppm, more preferably less than 50 ppm. The optical fiber comprises a concentration of fluorine of at least 0.02 wt %, preferably greater than 0.15 wt %, and preferably has a maximum concentration of fluorine between 0.5 and 0.15 wt %. The core comprises between 0.1 and 0.4 wt % fluorine, more preferably between 0.15 and 0.4 wt % fluorine, and in some preferred embodiments between 0.2 and 0.3 wt %. The core comprises preferably less than 500 ppm chlorine, more preferably less than 300 ppm chlorine, and in some preferred embodiments comprises less than 200 ppm chlorine. The cladding comprises greater than 0.5 wt % fluorine, preferably greater than 1 wt % fluorine, and in some preferred embodiments between 1 and 2 wt % fluorine.

In some preferred embodiments in the second set, the core comprises fluorine and an alkali metal oxide selected from the group consisting of $K_2O$, $Na_2O$, $LiO_2$, $Rb_2O$, $Cs_2O$ and mixtures thereof, with a peak alkali metal oxide concentration of between 20 and 1000 ppm, preferably between 20 and 700 ppm, even more preferably between 20 and 500 ppm, and still more preferably between 100 and 500 ppm; the core further comprises a peak relative refractive index, $\Delta\%(r)$, (relative to the cladding)>0.2%, and in other preferred embodiments, and the core further comprises a peak relative refractive index, $\Delta_{MAX}$, between 0.2 and 0.5%, and in still other preferred embodiments, the core further comprises a peak relative refractive index, $\Delta_{MAX}$, between 0.3 and 0.4%. The cladding comprises at least 0.02 wt % fluorine, preferably greater than 0.15 wt % fluorine, and has a maximum fluorine concentration of between 0.5 and 1.5 wt %.

In other preferred embodiments in the second set, optical fiber disclosed herein comprises a single core segment, namely a central core segment, and a cladding surrounding and directly adjacent the central core segment, wherein the cladding has a negative refractive index relative to pure silica, and wherein the core comprises fluorine and an alkali metal oxide selected from the group consisting of $K_2O$, $Na_2O$, $LiO_2$, $Rb_2O$, $Cs_2O$ and mixtures thereof, with a peak alkali metal oxide concentration of between 20 and 1000 ppm, preferably between 20 and 500 ppm, even more preferably between 100 and 400 ppm; wherein the core further comprises a peak relative refractive index (relative to the cladding), $\Delta_{MAX}$, between 0.2 and 0.5%, preferably between 0.3 and 0.4%, and the maximum alkali metal oxide concentration in the cladding is preferably less than 200 ppm, more preferably less than 50 ppm. The optical fiber comprises greater than 90 wt % SiO2, preferably greater than or equal to 95 wt % $SiO_2$. The core comprises preferably less than 500 ppm chlorine, more preferably less than 300 ppm chlorine, and in some preferred embodiments comprises less than 200 ppm chlorine.

In still other preferred embodiments in the second set, optical fiber disclosed herein comprises a single core segment, namely a central core segment, and a cladding surrounding and directly adjacent the central core segment, wherein the cladding has a negative refractive index $\Delta_{CLAD}(r)$ relative to pure silica, and wherein the core comprises fluorine and an alkali metal oxide selected from the group consisting of $K_2O$, $Na_2O$, $LiO_2$, $Rb_2O$, $Cs_2O$ and mixtures thereof, with a peak alkali metal oxide concentration of between 100 and 400 ppm, preferably between 200 and 300 ppm; wherein the core further comprises a peak relative refractive index (relative to the cladding), $\Delta_{MAX}$, between 0.2 and 0.5%, preferably between 0.3 and 0.5%, more preferably between 0.3 and 0.4%, and the maximum alkali metal oxide concentration in the cladding is preferably less than 200 ppm, more preferably less than 50 ppm. The optical fiber comprises greater than 90 wt % $SiO_2$, preferably greater than or equal to 95 wt % $SiO_2$. The core comprises preferably less than 500 ppm chlorine, more preferably less than 300 ppm chlorine, even more preferably less than 200 ppm, and in some preferred embodiments comprises less than 50 ppm chlorine.

In yet other preferred embodiments in the second set, optical fiber disclosed herein comprises a single core segment, namely a central core segment having a positive refractive index profile relative to the cladding and a negative refractive index profile relative to pure silica, and a cladding surrounding and directly adjacent the central core segment, wherein the cladding has a negative refractive index profile relative to pure silica, and wherein the core comprises fluorine and potassium oxide, with a peak potassium oxide concentration of between 100 and 400 ppm, preferably between 200 and 300 ppm; wherein the core further comprises a peak relative refractive index (relative to the cladding), $\Delta_{MAX}$, between 0.2 and 0.4%, preferably between 0.3 and 0.4%, and the maximum potassium oxide concentration in the cladding is preferably less than 200 ppm, more preferably less than 50 ppm. The optical fiber comprises greater than 90 wt % SiO2, preferably greater than or equal to 95 wt % SiO2. The core comprises preferably less than 500 ppm chlorine, more preferably less than 300 ppm chlorine, even more preferably less than 200 ppm, and in some preferred embodiments comprises less than 50 ppm chlorine.

In a third set of preferred embodiments, an optical fiber comprises a core comprising an alkali metal oxide selected from the group consisting of $K_2O$, $Na_2O$, $LiO_2$, $Rb_2O$, $Cs_2O$ and mixtures thereof, wherein the core is disposed about a longitudinal centerline; and a cladding surrounding and directly adjacent the core; wherein the fiber comprises an impurity substantially confined to a centermost region of the core. The optical fiber has an attenuation at 1550 nm less than 0.20 dB/km, preferably less than 0.19 dB/km, more preferably less than 0.185 dB/km, even more preferably less than 0.180 dB/km. Preferably, the core comprises less than about 100 ppb by wt. $^-OH$. Preferably, the impurity has a peak impurity concentration inside the centermost region which is at least 20% greater than any impurity concentration in the fiber located outside the centermost region; in some embodiments, the impurity concentration in the fiber located outside the centermost region is zero. The impurity can be an impurity selected from the consisting of a transition metal, a crystallized alkali compound, and an occlusion, and combinations or mixtures thereof.

In some embodiments of the third set, the optical fiber comprises a core comprising an alkali metal oxide selected from the group consisting of $K_2O$, $Na_2O$, $LiO_2$, $Rb_2O$, $Cs_2O$ and mixtures thereof, wherein the core is disposed about a longitudinal centerline, and a cladding surrounding and directly adjacent the core, wherein the core further comprises a centermost region comprising a transition metal with a peak transition metal concentration, and wherein the fiber outside of the centermost region has a maximum transition metal concentration of less than 20% of the peak transition metal concentration inside the centermost region. In various embodiments, the maximum transition metal concentration outside the centermost region is zero. Preferably, the centermost region extends between the centerline and a radius less than 5 μm. Preferably, the concentration of the transition metal is less than about 0.01 mol % for all radii greater than 5 μm. In some embodiments, the peak concentration of the transition metal in the centermost region is greater than about 0.1 mol %.

In other embodiments in the third set, an optical fiber comprises a core comprising an alkali metal oxide selected from the group consisting of $K_2O$, $Na_2O$, $LiO_2$, $Rb_2O$, $Cs_2O$ and mixtures thereof, wherein the core is disposed about a longitudinal centerline, and a cladding surrounding and directly adjacent the core, wherein the optical fiber comprises a transition metal having a peak concentration of greater than about 0.1 mol % between the centerline and a radius less than 5 μm, and wherein the concentration of the transition metal is less than about 0.01 mol % for all radii greater than 5 μm.

In all of the embodiments disclosed herein, the optical fiber preferably comprises a primary coating surrounding and in direct contact with the outermost diameter of the cladding, and a secondary coating surrounding and in direct contact with the primary coating.

In some preferred embodiments of the optical fiber disclosed herein, the optical fiber further comprises an outermost hermetic coating on its exterior. The exterior hermetic coating preferably surrounds and is in direct contact with the secondary coating. In one preferred embodiment, an optical fiber disclosed herein comprises a germania- and $K_2O$-doped core, a cladding surrounding and in direct contact with the core, a primary coating surrounding and in direct contact with the cladding, a secondary coating surrounding and in direct contact with the primary coating, and a hermetic coating surrounding and in direct contact with the secondary coating. U.S. Pat. No. 5,152,817 describes a method and apparatus for producing a hermetically coated optical fiber.

EXAMPLE 1

A $K_2O$-doped glass core rod was formed in accordance with the method described with reference to FIG. 11 herein above. As shown in FIG. 17, the glass core rod had a $K_2O$ concentration 164 as a function of radius that approximated a Gaussian curve. The curve 166 indicates the relative refractive index of the glass rod with respect to pure silica. The starting tube for the $K_2O$ diffusion was pure (undoped) silica. The core rod had a $K_2O$ concentration 164 having a maximum at about the centerline 168 of the rod of about 1 wt. %. The portion 171 corresponding to the outer portion of the rod is preferably substantially devoid of alkali doping. In particular, the doping is such that the outer half portion of the rod has the lowest concentration of alkali and the inner half portion has the greatest concentration. More particularly, it is preferred that the peak concentration in the outer half portion has less than 50% of the alkali dopant peak concentration in the inner half; more preferably less than 25%.

EXAMPLE 2

A $Na_2O$-doped glass rod was formed in a method as described herein above with reference to FIG. 11. As shown in FIG. 18, the glass rod had a $Na_2O$ concentration 170 as a function of radius that approximated a Gaussian curve. The curve 172 indicates the relative refractive index of the glass rod with respect to pure silica. The rod had a $Na_2O$ concentration 170 having a maximum at about the centerline 174 of the glass rod of greater than 2 wt. %.

EXAMPLE 3

Figure 12:
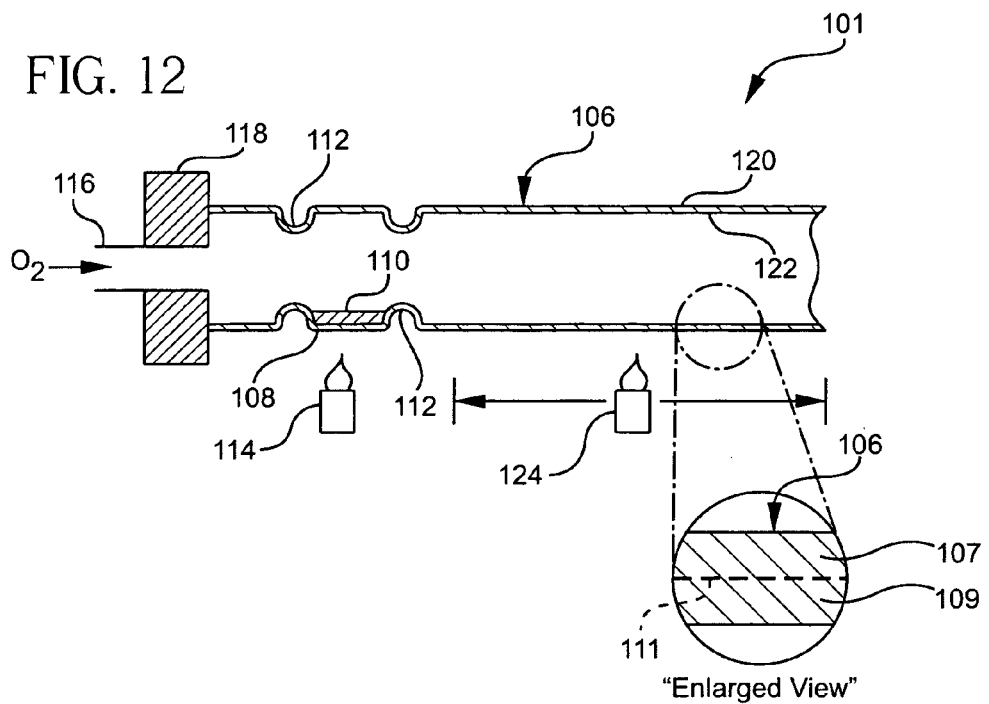
FIG. 12 depicts a method for doping a glass tube with an alkali metal oxide.
Figure 19:
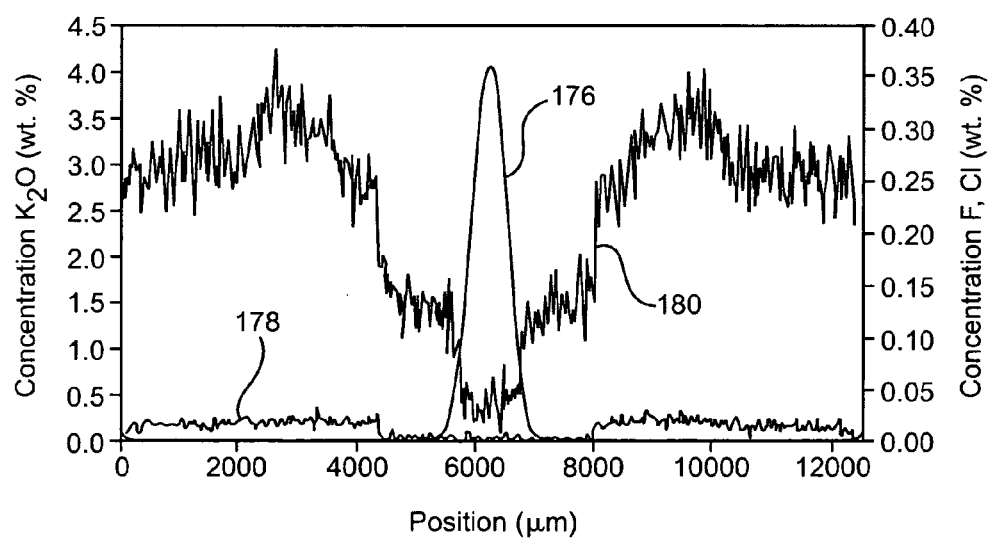
FIG. 19 is a plot showing the concentrations of $K_2O$, F and Cl across an optical fiber preform manufactured according to the present invention.
Figure 20:
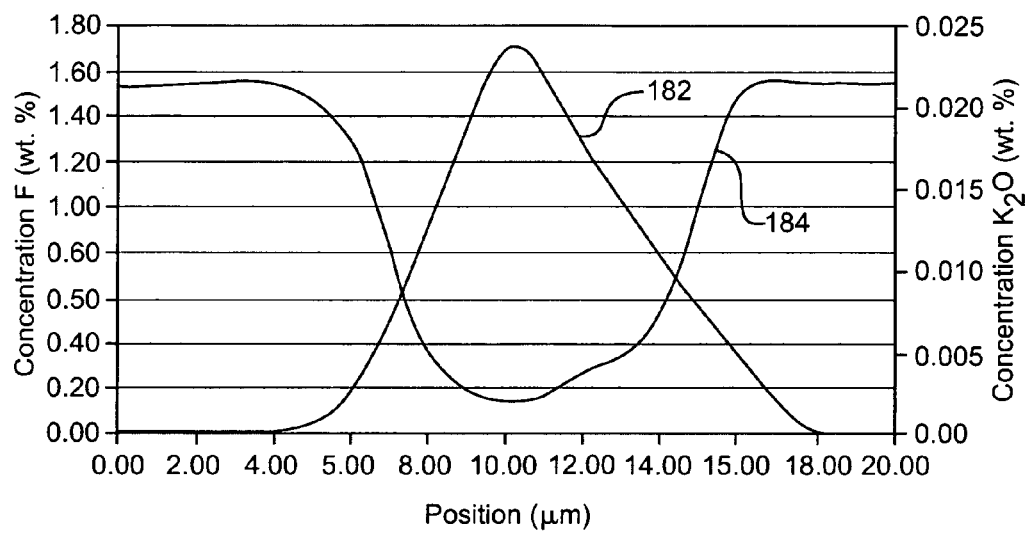
FIG. 20 shows the concentration of $K_2O$ and F for a single mode optical fiber having a $K_2O$-doped core and a F-doped cladding.

A silica tube was doped with $K_2O$ using the method disclosed herein and as depicted in FIG. 12. The alkali metal source compound 110 was KI. Burner 114 was used to heat the KI to a temperature of between about 1100° C. to 1200° C. Burner 124 was traversed along tube 106 at a speed of about 220 mm/min in a forward direction and 400 mm/min in a reverse direction until the alkali metal source compound 110 was vaporized. Reservoir 108 was cut from tube 106 and tube 106 was collapsed to form a first glass rod. The first glass rod was etched in 49% HF for 13 hours. The first glass rod was then placed in a lathe and silica glass soot was deposited on the first glass rod in a conventional outside vapor deposition process to form a first composite glass article. The first glass article was consolidated, dried and F-doped by conventional consolidation doping, and then drawn to form a second glass rod. The second glass rod was measured with a microprobe across a diameter of the rod. FIG. 19 depicts the concentrations of $K_2O$, curve 176, Cl, curve 178, and F, curve 180 across a diameter of the second glass rod. The second glass rod was placed in a lathe and additional silica soot was deposited on the second glass rod to form a second composite glass article. The second glass article was consolidated, dried and F-doped by conventional methods, and then drawn to form a third glass rod. The third glass rod was placed in a lathe and silica soot was deposited on the third glass rod in a conventional outside vapor deposition process to form a fourth composite glass article. The fourth composite glass article was consolidated, dried with Cl gas, and F-doped during consolidation to form an optical fiber preform ready for drawing into an optical fiber (draw preform). The optical fiber draw preform was drawn into an optical fiber at 7 m/s at a fiber tension of 70 g. The optical fiber had a cutoff wavelength (as determined on a 2 meter length of fiber) of 1150 nm, and an attenuation of 0.17 dB/km at 1550 nm. A microprobe analysis of the optical fiber was made, and a plot of the dopant concentrations in the optical fiber as a function of radius is shown in FIG. 20, wherein curve 182 represents the concentration of $K_2O$ in wt. % and curve 184 represents the concentration of F in wt. %.

EXAMPLE 4

Figure 21:
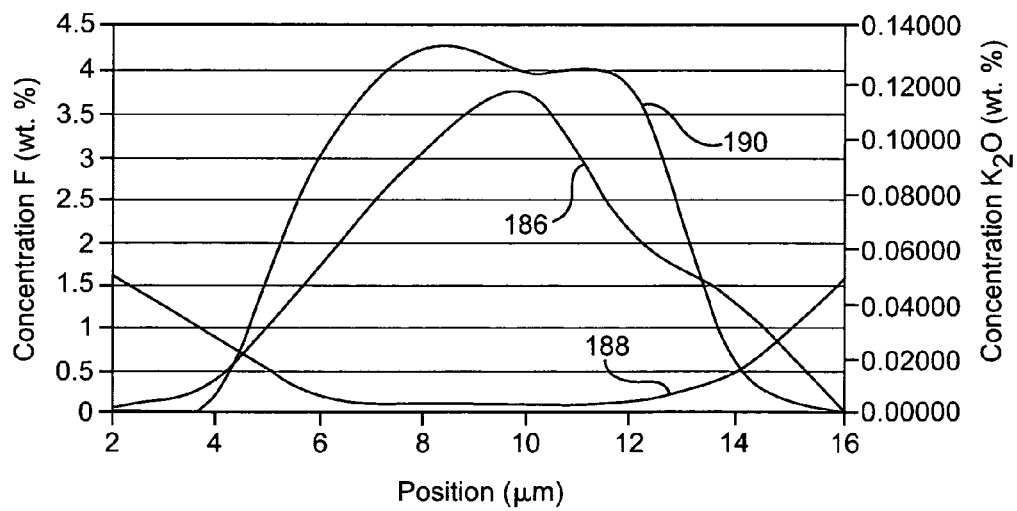
FIG. 21 shows the concentration of $K_2O$, F and $GeO_2$ for a single mode optical fiber having a core doped with $GeO_2$.

Another optical fiber was manufactured by doping a glass tube with $GeO_2$. The glass tube was then doped with $K_2O$ by the diffusion method described herein, collapsed and drawn into a $K_2O$—$GeO_2$ doped glass rod. The glass rod was overclad by depositing glass soot on the rod in a conventional outside vapor deposition method, and then consolidated conventionally to form an optical fiber draw preform. The overclad soot was doped with F during the consolidation process. The draw preform was drawn into a single-mode optical fiber having a step index core with a peak relative refractive index % Δ for the core of about 0.75%. The optical fiber had an attenuation of 0.228 dB/km at 1550 nm. A microprobe analysis of the optical fiber was made, and a plot of the dopant concentrations in the optical fiber as a function of radius is shown in FIG. 21, wherein curve 186 represents the concentration of $K_2O$ in wt. %, curve 188 represents the concentration of F in wt. %, and curve 190 represents the concentration of $GeO_2$ in wt. %

EXAMPLE 5

A $SiO_2$ glass tube containing $GeO_2$ was doped with $K_2O$ in accordance with the present invention. The tube was collapsed by heating the tube with a traversing $H_2/O_2$ burner flame to form a solid, large diameter glass rod having a diameter of between about 15 mm and 17 mm. The burner flame was traversed at between about 1.5 cm/min and 2 cm/min. The flame temperature was between about 2150° C. and 2200° C. The outside of the large diameter glass rod was etched for about 8 hours in a 49% HF solution to remove impurities at the surface of the rod. The peak amount of $K_2O$ in the large diameter glass rod was between about 1.5% wt. % and 2 wt. %. The large diameter glass rod had a relative refractive index between about 0.35% and 0.4% relative to pure silica. The large diameter glass rod was then drawn by conventional drawing methods to obtain a small diameter glass rod having a diameter of about 6 mm. The small diameter glass rod was cut into multiple sections. A porous glass soot core preform was manufactured by an outside vapor deposition method wherein glass soot was deposited onto a target, or bait rod. The porous glass soot core preform contained core glass soot and at least a portion of the cladding glass soot. Once the porous soot preform was formed, the target rod was removed, leaving a hole along the centerline of the preform. The small diameter glass rod comprising $K_2O$ and $GeO_2$ was inserted into the centerline hole of the porous glass soot preform to form a first composite preform. The first composite preform was then consolidated in a conventional consolidation furnace to form a consolidated core preform. The consolidated core preform was drawn in a conventional redraw furnace to form a second glass core rod. The second glass core rod was cut into multiple sections. A first core rod section was placed in a glass forming lathe, and additional cladding glass soot was deposited onto the first core rod to form a second composite preform. The second composite preform was consolidated in a conventional consolidation furnace to form a consolidated draw preform. The draw preform was then drawn into optical fiber by conventional methods to form an optical fiber having a core doped with $K_2O$ and $GeO_2$. The remaining second glass core rod sections were processed in a similar manner to obtain draw preforms, and the draw preforms were drawn into optical fibers. The optical fibers were measured for optical loss (attenuation) using both a spectral attenuation measurement bench according to ELA/TIA FOTP-78 and by optical time domain reflectometry (OTDR) EIA/TLA FOTP-60. The subsequent measurement results are provided in the Table 1 below. In the Table 1, MFD denotes the mode field diameter of the optical fiber measured at a wavelength of 1310 nm, the cutoff wavelength of the fiber is the cutoff wavelength as measured on a 2 meter length of fiber according to EIA/TIA FOTP-80.

TABLE 1

| Fiber | Draw Speed (m/s) | Attenuation dB/km @ 1550 nm (OTDR) | Attenuation dB/km @ 1550 nm (Spectral) | MFD @ 1310 nm | Fiber Cutoff Wavelength (nm) | Zero Dispersion Wavelength (nm) | Zero Dispersion Slope (ps/nm²/km) |
|---|---|---|---|---|---|---|---|
| 1 | 20 | 0.1830 | 0.185 | 9.55 | 1508.8 | 1308.1 | 0.088 |
| 2 | 20 | 0.1783 | 0.176 | 9.60 | 1427.4 | 1309.1 | 0.088 |
| 3 | 20 | 0.1821 | 0.175 | 9.25 | 1518.3 | 1316.1 | 0.086 |
| 4 | 10 | 0.1853 | 0.184 | 9.27 | 1518.7 | 1317.4 | 0.086 |
| 5 | 10 | 0.1799 | 0.183 | 9.31 | 1302.7 | 1320.9 | 0.085 |
| 6 | 10 | 0.1827 | 0.182 | 9.24 | 1189.5 | 1322.6 | 0.084 |
| 7 | 20 | 0.1827 | 0.180 | 9.37 | 1200.2 | 1323.5 | 0.084 |
| 8 | 20 | 0.1809 | 0.177 | 9.24 | 1311.1 | 1318.5 | 0.085 |

EXAMPLE 6

Figure 22:
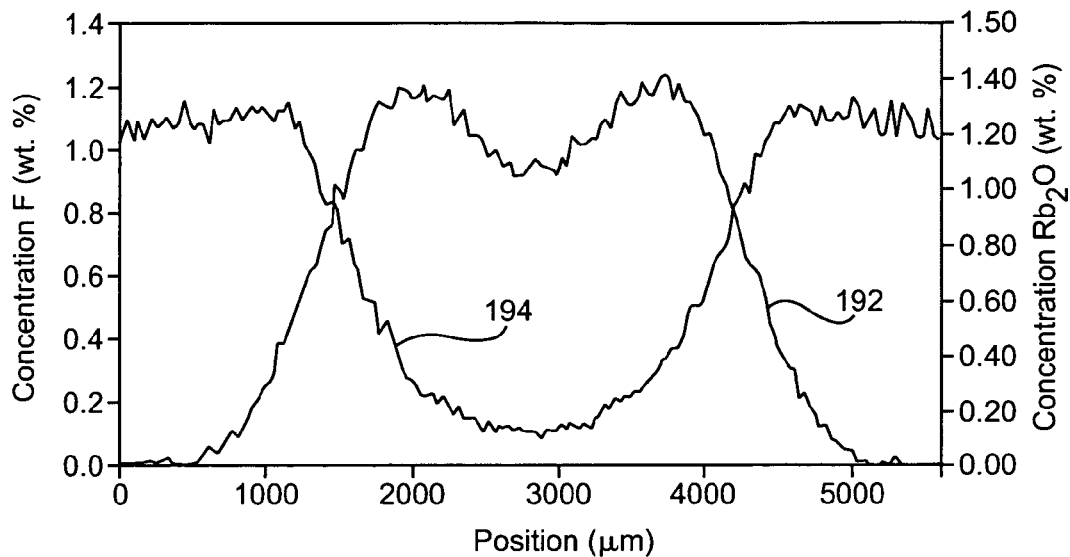
FIG. 22 shows the concentration of $Rb_2O$ and F in an optical fiber preform core rod.
Figure 23:
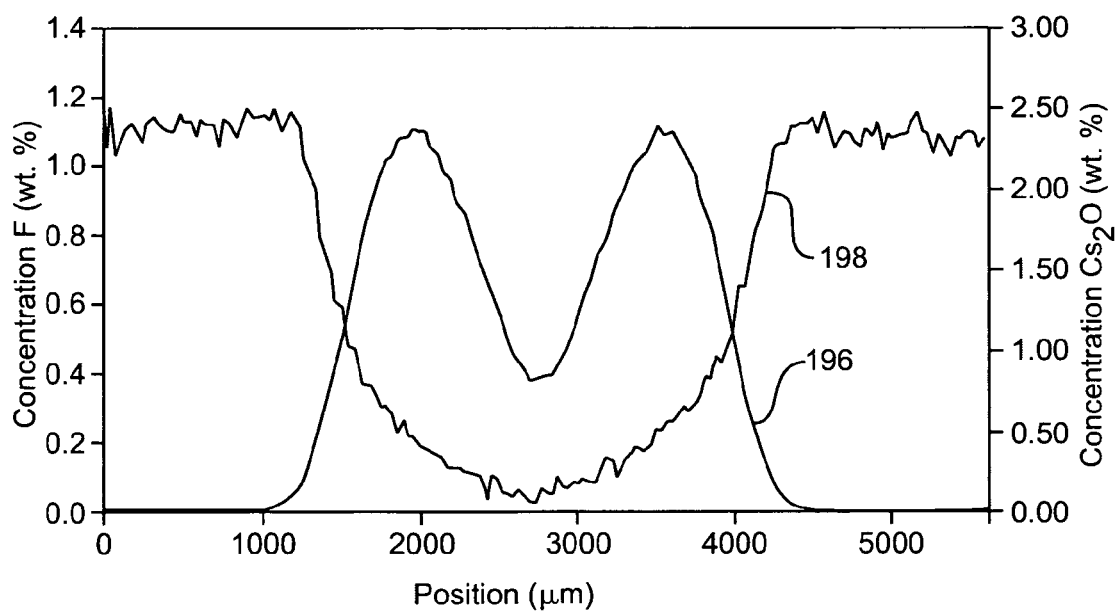
FIG. 23 shows the concentration of $Cs_2O$ and F in an optical fiber preform core rod.

A first silica glass tube was doped with $Rb_2O$ in accordance with the method disclosed herein. The tube was heated and collapsed to form a solid glass core rod. A second silica glass tube was doped with $Cs_2O$, also in accordance with the method disclosed herein. The second glass rod was further heated and collapsed to form a second solid glass core rod doped with $Cs_2O$. Both the $Rb_2O$-doped glass core rod and the $Cs_2O$-doped glass core rod were measured by electron microprobe across a portion of the diameter of the glass rods near the centerline of each rod. The concentrations of $Rb_2O$ and $Cs_2O$ across the measured diameters of each glass rod are indicated in FIG. 22 and FIG. 23, respectively. In FIG. 22, curve 192 depicts the concentration of $Rb_2O$ across a portion of the diameter of the glass core rod, and curve 194 depicts the concentration of F. In FIG. 23, curve 196 depicts the concentration of $Cs_2O$ across a portion of the diameter of the glass core rod, and curve 198 depicts the concentration of F.

EXAMPLE 7

Figure 24:
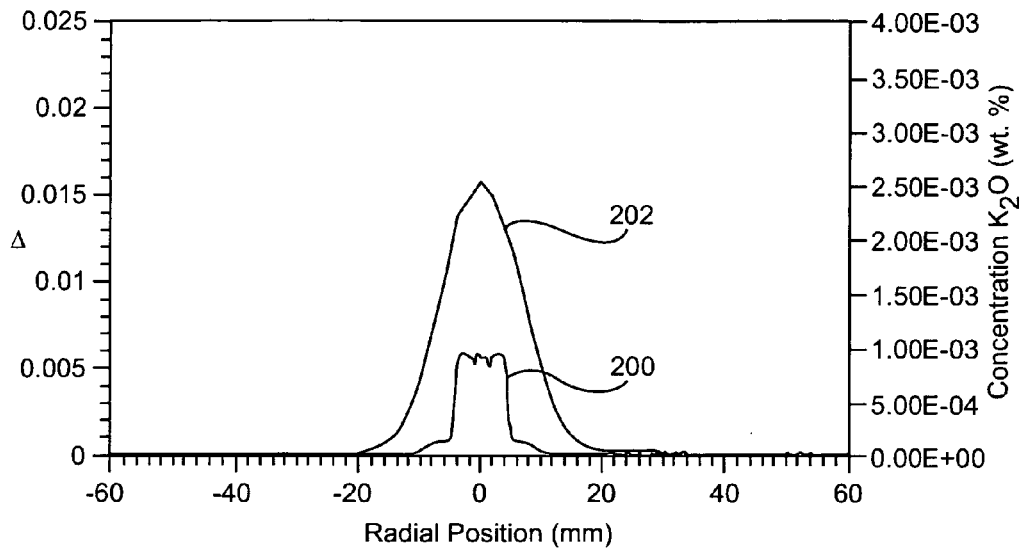
FIG. 24 illustrates both the concentration distribution and the relative refractive index as a function of radius for an optical fiber made in accordance with the method disclosed herein.

A core rod from Example 5 supra was used to make an optical fiber. The optical fiber had a refractive index profile and a concentration of $K_2O$ as indicated in FIG. 24. In FIG. 24, the curve 200 denotes the core refractive index profile and curve 202 denotes the concentration of $K_2O$ as a function of radius. The optical fiber had an attenuation of 0.1827 dB/km at 1550 nm when measured via optical time domain reflectometry (OTDR), and a mode field diameter of 9.52 μm at 1310 nm. The optical fiber also had cutoff wavelength of about 1519 nm, a zero dispersion wavelength of 1308.2 nm, and a dispersion slope at the zero dispersion wavelength of 0.088 ps/nm²/km. The optical fiber was drawn at a draw speed of 10 m/s and a fiber tension of 150 g.

EXAMPLE 8

Figure 25:
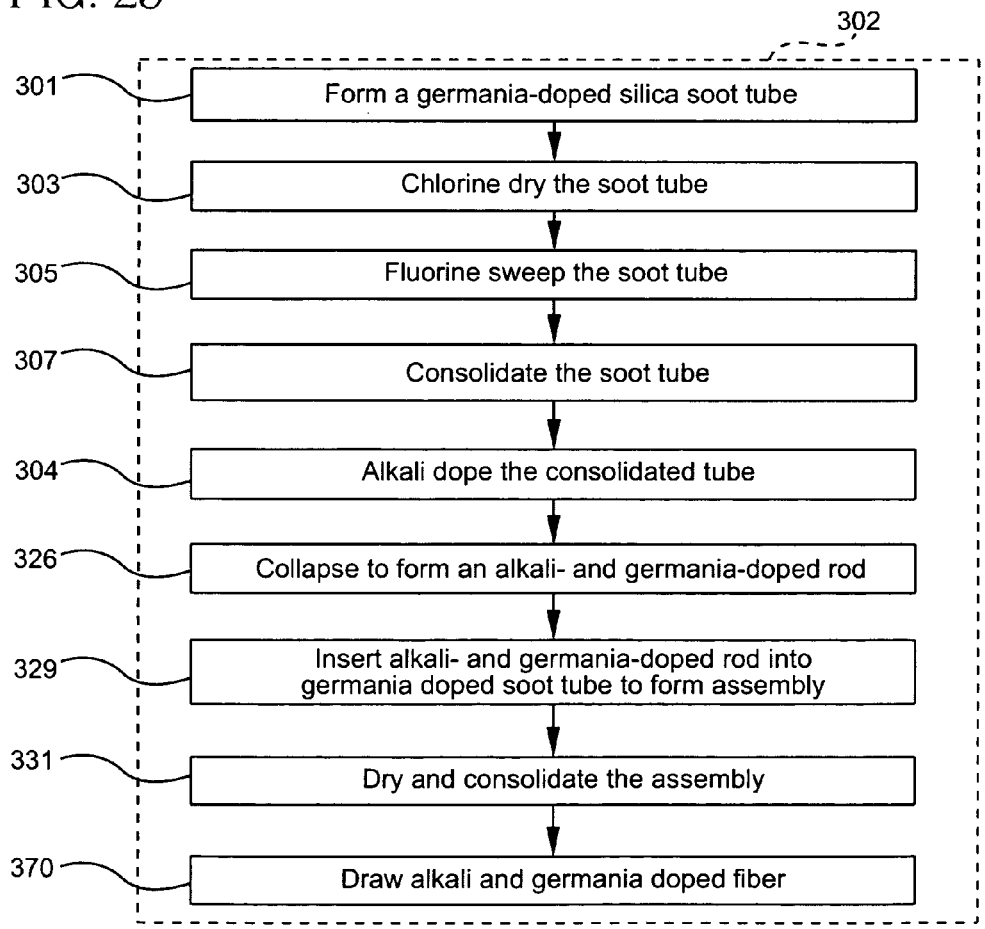
FIG. 25 illustrates a flowchart of one preferred method for manufacturing an optical fiber in accordance with an aspect of the invention.
Figure 26:
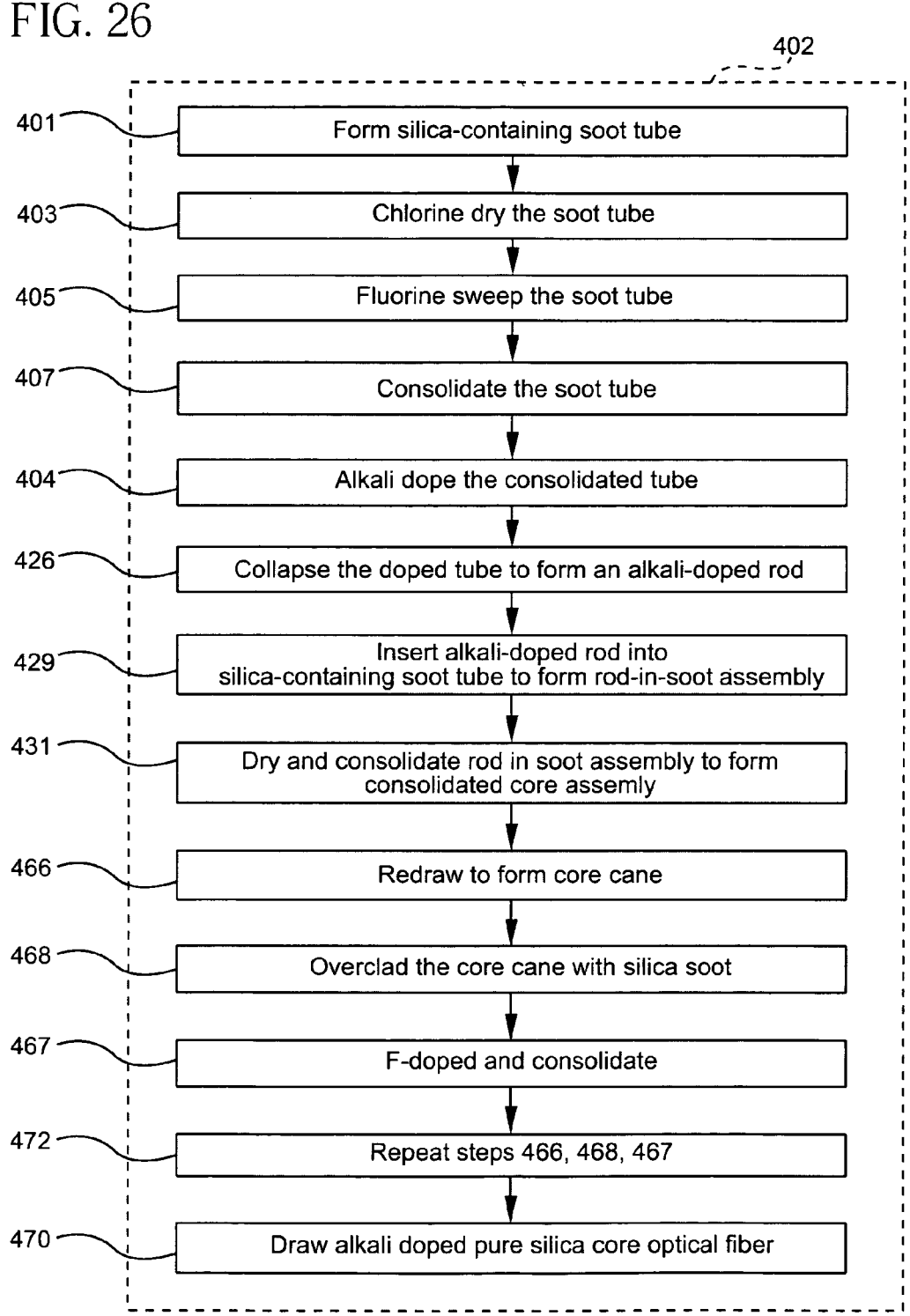
FIG. 26 illustrates a flowchart of another preferred method for manufacturing an optical fiber in accordance with an aspect of the invention.
Figure 31:
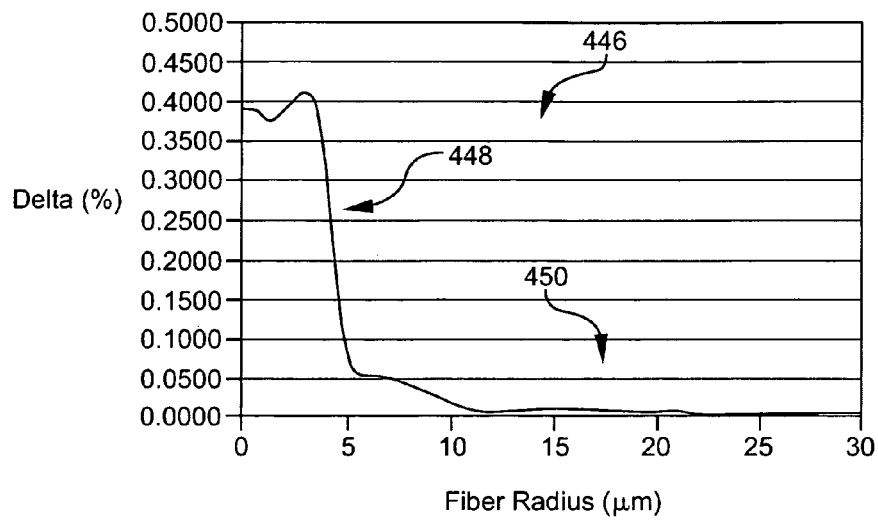
FIG. 31 is a refractive index profile of a germania-doped optical fiber according to an aspect of the invention.

FIG. 31 shows a relative refractive index profile of an optical fiber belonging to the first set of preferred optical fiber embodiments disclosed herein which was fabricated according to the method represented by FIG. 25. $\Delta_{MAX}$=0.41%, the half-height peak width, HHPW, is 4.4 μm, RCORE=7.1 μm, and the cladding extends to a radius of 62.5 μm. A diffusion tail extends into the cladding from 7.1 μm up to about 22 μm.

Figure 32:
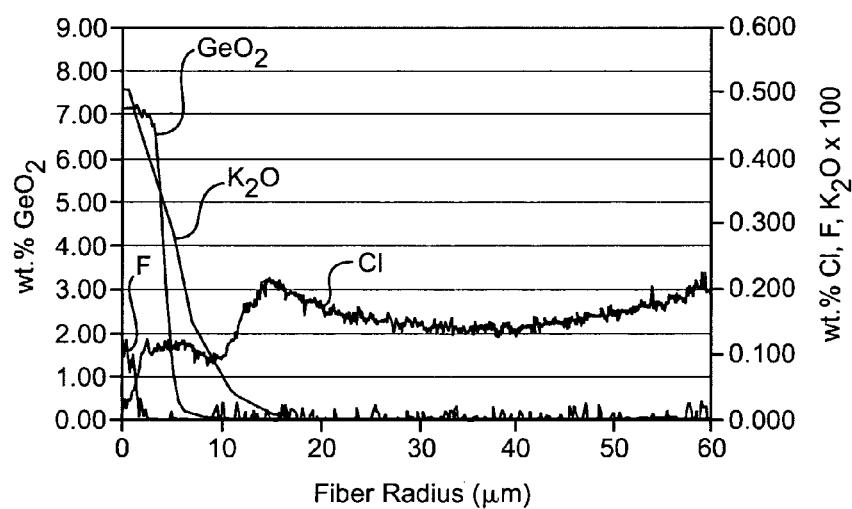
FIG. 32 is a plot of wt. % of various dopants versus fiber radius.

FIG. 32 shows the concentration profiles of $K_2O$, $GeO_2$, F, and Cl measured in the fiber of FIG. 31. Table 2 summarizes FIG. 32.

TABLE 2

|  |  | Core | Cladding |
|---|---|---|---|
| Maximum $K_2O$ | ppm | 48 | 15 |
| Maximum $GeO_2$ | wt % | 7.6 | 0.12 |
| Maximum F | wt % | 0.12 | 0.03 |
| Minimum Cl | wt % | 0.016 | 0.08 |
| Maximum Cl | wt % | 0.12 | 0.22 |

Table 3 lists the measured properties of the optical fiber of FIGS. 31 and 32:

TABLE 3

| Length | meters | 7797 |
|---|---|---|
| Attenuation at 1310 nm | dB/km | 0.326 |
| Attenuation at 1380 nm | dB/km | 0.959 |
| Attenuation at 1410 nm | dB/km | 0.454 |
| Attenuation at 1550 nm | dB/km | 0.183 |
| Attenuation at 1625 nm | dB/km | 0.193 |
| Mode Field Diameter at 1310 nm | μm | 9.52 |
| Fiber Cutoff | μm | 1519 |
| Zero Dispersion Wavelength | nm | 1308 |
| Dispersion Slope at 1310 nm | ps/nm²–km | 0.088 |

EXAMPLES 9, 10, 11

Figure 33:
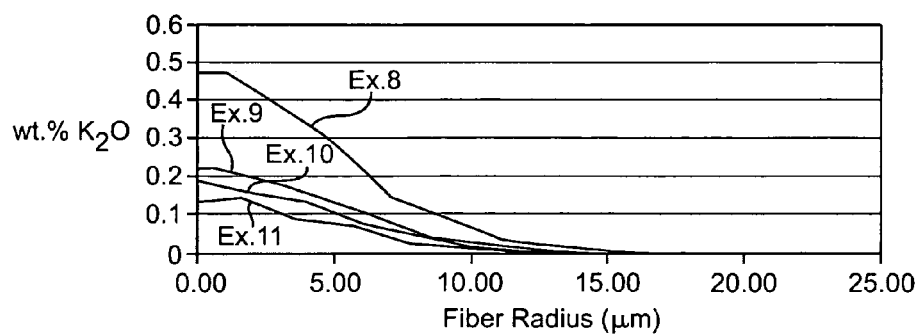
FIG. 33 is a plot of wt. % of $K_2O$ versus fiber radius for various fiber embodiments.

FIG. 33 shows the concentration profile of $K_2O$ in the fiber of Example 8 (represented by FIG. 31) as well as the concentration profiles of $K_2O$ in optical fibers, Examples 9-11, which were otherwise generally similar to Example 8, except for the $K_2O$ dopant profile. Table 4 lists the peak concentration and half peak height width of the $K_2O$ profiles as well as the corresponding measured attenuation at 1550 nm for Examples 8-11. Example 11 had the lowest $K_2O$ peak, lowest $K_2O$ profile, and highest attenuation. We found that reductions in attenuation attributable to the presence of $K_2O$ dropped off for peak $K_2O$ concentrations less than about 20 ppm.

TABLE 4

|  |  | Example 8 | Example 9 | Example 10 | Example 11 |
|---|---|---|---|---|---|
| Maximum $K_2O$ | ppm | 48 | 22 | 19 | 14 |
| HHPW $K_2O$ | μm | 5.4 | 5.9 | 5.4 | 5.8 |

TABLE 4-continued

|  |  | Example 8 | Example 9 | Example 10 | Example 11 |
|---|---|---|---|---|---|
| Attenuation at 1550 nm | dB/km | 0.183 | 0.179 | 0.180 | 0.198 |

EXAMPLE 12

Figure 34:
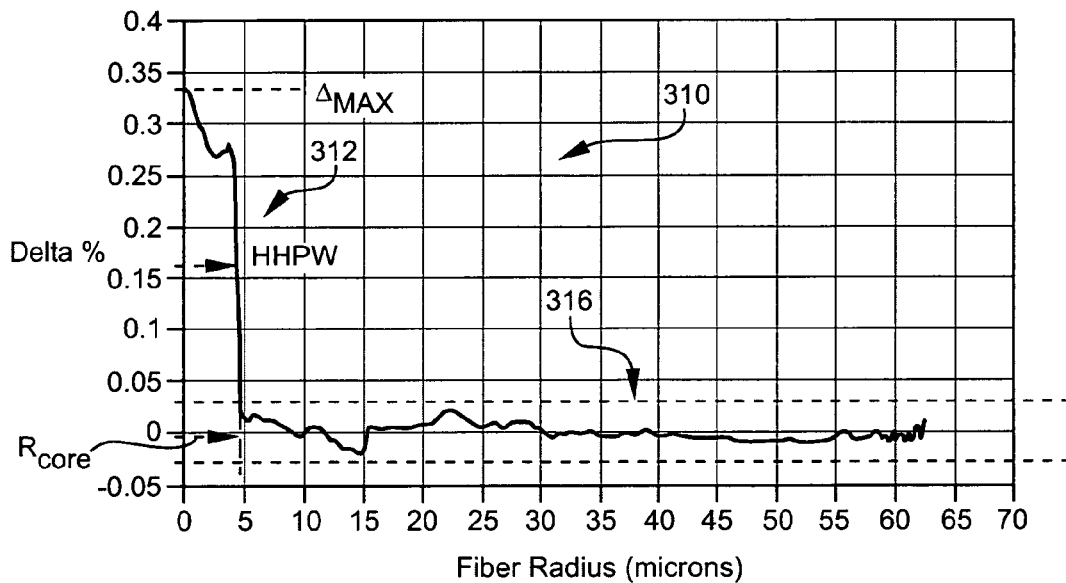
FIG. 34 is a refractive index profile of another optical fiber according to an aspect of the invention.

FIG. 34 shows a relative refractive index profile of a representative optical fiber belonging to the second set of preferred embodiments disclosed herein which was fabricated according to the method represented by FIG. 26. $\Delta_{MAX}$=0.33%, the half-height peak width, HHPW, is 4.4 μm, RCORE=4.7 μm, and the cladding extends to a radius of 62.5 μm. The average concentration of $K_2O$ in the core is 250 ppm, Table 5 lists the measured properties of the optical fiber of FIG. 34:

TABLE 5

|  | Example 12 |  |
|---|---|---|
| Spectral Attenuation |  |  |
| 1310 nm | 0.289 | dB/km |
| 1550 nm | 0.167 | dB/km |
| 1625 nm | 0.189 | dB/km |
| Chromatic Dispersion |  |  |
| Lambda Zero | 1296 | nm |
| 1310 nm | 1.19 | ps/(nm · km) |
| 1550 nm | 17.23 | ps/(nm · km) |
| 1625 nm | 21.11 | ps/(nm · km) |
| Slope @ Lambda Zero | 0.0861 | ps/nm² · km |
| Slope @ 1550 nm | 0.0543 | ps/nm² · km |
| Mode Field Diameter |  |  |
| 1310 nm | 8.90 | μm |
| 1550 nm | 10.22 | μm |
| Fiber Cutoff | 1298 | nm |

EXAMPLES 13 to 17

Additional representative optical fibers belonging to the second set of preferred embodiments disclosed herein were fabricated according to the method represented by FIG. 26 with a refractive index profile similar to FIG. 34. Example 18, a comparative optical fiber with a high $K_2O$ concentration in the core, was also fabricated and measured.

Table 6 lists measured values for Examples 13 to 18:

TABLE 6

|  | Example | | | | | |
|---|---|---|---|---|---|---|
|  | 13 | 14 | 15 | 16 | 17 | 18 |
| Avg $K_2O$ (ppm) | 109 | 176 | 220 | 220 | 222 | 462 |
| Min Core F (wt %) |  | 0.026 | 0.14 | 0.16 | 0.17 | 0.12 |
| Min Clad F (wt %) |  |  | 1.08 | 1.17 | 1.04 | 1.12 |
| Max Clad F (wt %) |  |  | 1.43 | 1.49 | 1.41 | 1.49 |
| Max Core Cl (wt %) |  | 0.013 | 0.025 | 0.025 | 0.022 | 0.029 |
| Attenuation (via OTDR) @ 1310 nm (dB/km) | 0.307 |  | 0.295 |  | 0.295 |  |

TABLE 6-continued

| | Example | | | | | |
|---|---|---|---|---|---|---|
| | 13 | 14 | 15 | 16 | 17 | 18 |
| Attenuation (via OTDR) @ 1550 nm (dB/km) | 0.178 | | 0.169 | | 0.171 | |
| Attenuation (via Spectral) @ 1310 nm (dB/km) | 0.307 | 0.281 | 0.296 | 0.295 | 0.296 | 0.659 |
| Attenuation (via Spectral) @ 1550 nm (dB/km) | 0.178 | 0.165 | 0.17 | 0.169 | 0.17 | 0.528 |

The comparative Example 18 had a high measured attenuation at 1550 nm.

Figure 35:
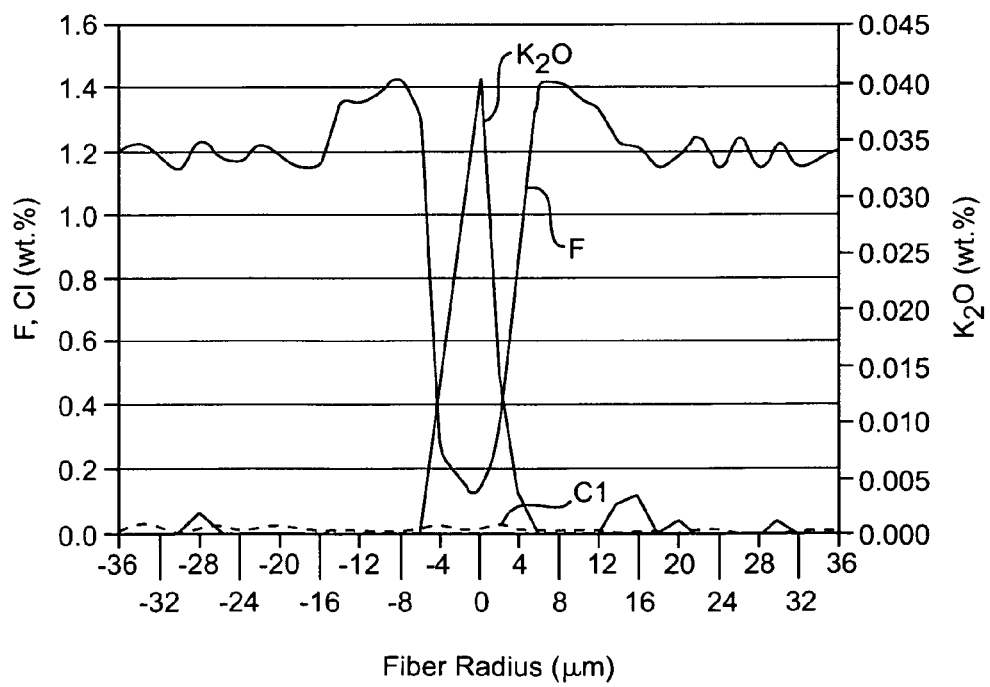
FIG. 35 is a plot of wt. % of various dopants versus fiber radius for another optical fiber in accordance with the invention.

FIG. 35 shows the concentration profile of $K_2O$, F, and Cl of Example 15. The peak concentration of $K_2O$ in the core is 400 ppm, and the full-width half maximum (FWHM) of the $K_2O$ concentration profile is 4.8 μm.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:

1. An optical fiber comprising:
   a silica-based core comprising fluorine, and $K_2O$ in a peak concentration between 20 and 1000 ppm; and
   a silica-based cladding surrounding and directly adjacent the core;
   wherein the attenuation at 1550 nm is less than 0.185 dB/km.

2. The optical fiber of claim 1 wherein the attenuation at 1550 nm is less than 0.18 dB/km.

3. The optical fiber of claim 1 wherein the attenuation at 1550 nm is less than 0.17 dB/km.

4. The optical fiber of claim 1 wherein the attenuation at 1550 nm is less than or equal to 0.167 dB/km.

5. The optical fiber according to claim 1 wherein the concentration of $K_2O$ in the core decreases with a radius of the optical fiber.

6. The optical fiber according to claim 1 wherein the peak concentration of $K_2O$ in the core is greater than about 20 ppm and less than about 700 ppm.

7. The optical fiber according to claim 1 wherein the concentration of $K_2O$ at a radius equal to a mode field radius of the optical fiber is at least about 1 ppm.

8. The optical fiber according to claim 1 wherein the core comprises $GeO_2$.

9. The optical fiber according to claim 1 wherein the core comprises a plurality of segments.

10. The optical fiber according to claim 1 wherein the cladding comprises F.

11. The optical fiber according to claim 1 wherein the peak amount of $K_2O$ in the core is greater than about 20 ppm and less than about 500 ppm.

12. The optical fiber according to claim 1 further comprising an exterior hermetic coating.

13. The optical fiber according to claim 1 wherein the core has a graded refractive index profile and the optical fiber is a multimode fiber.

14. The optical according to claim 1 wherein the dispersion at 1550 nm is between 1 and 6 ps/nm-km.

15. The optical according to claim 1 wherein the dispersion at 1550 nm is between 6 and 15 ps/nm-km.

16. An optical fiber comprising:
   a silica-based core comprising fluorine and $K_2O$ in a peak concentration between 20 and 1000 ppm; and
   a silica-based cladding surrounding and directly adjacent the core;
   wherein the core has a refractive index profile with a peak relative refractive index, $\Delta_{mAx}$, greater than 0.2%, relative to the cladding.

17. The optical fiber of claim 16 wherein the optical fiber has an attenuation at 1550 nm of less than 0.185 dB/km.

18. The optical fiber of claim 16 wherein the attenuation at 1550 nm is less than 0.18 dB/km.

19. The optical fiber of claim 16 wherein the attenuation at 1550 nm is less than or equal to 0.17 dB/km.

20. The optical fiber of claim 16 wherein the attenuation at 1550 nm is less than or equal to 0.167 dB/km.

21. The optical fiber of claim 16 wherein the fiber is a multimode fiber and the core comprises at least 70 wt % $SiO_2$.

22. The optical fiber of claim 16 wherein the core comprises at least 80 wt % $SiO_2$.

23. The optical fiber of claim 13 wherein the core comprises at least 90 wt % $SiO_2$.

24. The optical fiber of claim 16 wherein the core further comprises chlorine in a peak concentration of less than 3000 ppm.

25. The optical fiber of claim 16 wherein the peak concentration of the $K_2O$ is less than 700 ppm.

26. The optical fiber of claim 16 wherein the average concentration of the $K_2O$ is less than 350 ppm.

27. The optical fiber of claim 16 wherein the peak concentration of the $K_2O$ is less than 500 ppm.

28. The optical fiber of claim 16 wherein the peak concentration of the $K_2O$ is between 20 and 500 ppm.

29. The optical fiber of claim 16 wherein the peak concentration of the $K_2O$ is between 30 and 150 ppm.

30. The optical fiber of claim 27 wherein the core further comprises chlorine in a peak concentration less than 3000 ppm.

31. The optical fiber of claim 27 wherein the core has a maximum concentration of fluorine of less than 0.2 wt %.

32. The optical fiber of claim 16 wherein the peak concentration of the $K_2O$ is between 200 and 500 ppm.

33. The optical fiber of claim 16 wherein the average concentration of the $K_2O$ is between 100 and 300 ppm.

34. The optical fiber of claim 32 wherein the core has a concentration of fluorine of greater than 0.02 wt %.

35. The optical fiber of claim 32 wherein the core has a concentration of fluorine of greater than 0.15 wt %.

36. The optical fiber of claim 32 wherein the core has a maximum concentration of fluorine of between 0.5 and 1.5 wt %.

37. The optical fiber of claim 32 wherein the core contains no germania.

38. The optical fiber of claim 32 wherein the core further comprises chlorine in a peak concentration less than 500 ppm.

* * * * *